United States Patent
Terahara et al.

(10) Patent No.: US 7,796,887 B2
(45) Date of Patent: Sep. 14, 2010

(54) WAVELENGTH DIVISION MULTIPLEXING OPTICAL TRANSMISSION SYSTEM, AND WAVELENGTH DIVISION MULTIPLEXING OPTICAL TRANSMISSION METHOD

(75) Inventors: Takafumi Terahara, Kawasaki (JP); Kentaro Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 948 days.

(21) Appl. No.: 10/606,935

(22) Filed: Jun. 27, 2003

(65) Prior Publication Data
US 2004/0062550 A1 Apr. 1, 2004

(30) Foreign Application Priority Data
Jun. 28, 2002 (JP) .............................. 2002-191346

(51) Int. Cl.
H04J 14/00 (2006.01)
H04B 10/08 (2006.01)

(52) U.S. Cl. .............................. 398/68; 398/26; 398/33

(58) Field of Classification Search ................ 398/153, 398/68, 48, 55, 24, 79, 42, 186
See application file for complete search history.

(56) References Cited

U.S. PATENT DOCUMENTS

| | | | |
|---|---|---|---|
| 5,937,116 A | 8/1999 | Seto | |
| 6,490,064 B1 * | 12/2002 | Sakamoto et al. | 398/81 |
| 6,496,297 B1 * | 12/2002 | Frankel et al. | 359/279 |
| 6,567,196 B1 * | 5/2003 | Archambault | 398/79 |
| 6,607,311 B1 * | 8/2003 | Fishman et al. | 398/79 |
| 6,611,340 B2 * | 8/2003 | Gu | 356/491 |
| 6,690,886 B1 * | 2/2004 | Guy | 398/81 |
| 6,865,348 B2 * | 3/2005 | Miyamoto et al. | 398/183 |
| 7,035,484 B2 * | 4/2006 | Silberberg et al. | 385/1 |

(Continued)

FOREIGN PATENT DOCUMENTS

EP 0 715 429 6/1996

(Continued)

OTHER PUBLICATIONS

Sebastien Bigo, The road to multi-terabit/s WDM transmissions, IEEE LEOS News Letter, vol. 15, No. 5, Oct. 2001.*

(Continued)

*Primary Examiner*—Shi K Li
(74) *Attorney, Agent, or Firm*—Staas & Halsey LLP

(57) ABSTRACT

The invention aims to provide an optical transmission system that specifies such a transmission condition so as to obtain high spectrum efficiency and a large transmission distance-capacity product at the same time, and uses low cost and small sized optical senders and optical receivers, to realize a high density wavelength multiplexing optical transmission. For this purpose, a WDM optical transmission system of the invention has a system structure that specifies by calculation the spectrum efficiency at which transmission distance-capacity product becomes a maximum value based on the determination of the type of signal light modulation and the assumption of an equation model expressing transmission characteristics of an optical multiplexer and an optical demultiplexer, and optimizes a bit rate and frequency spacing of signal light output from each optical sender, and the transmission characteristics of the optical multiplexer and the optical demultiplexer, so as to approach the spectrum efficiency.

16 Claims, 23 Drawing Sheets

U.S. PATENT DOCUMENTS

| | | | |
|---|---|---|---|
| 7,340,182 | B2 | 3/2008 | Uemura et al. |
| 2002/0015212 | A1* | 2/2002 | Fujiwara et al. ............. 359/238 |
| 2002/0021464 | A1* | 2/2002 | Way ........................... 359/124 |
| 2002/0025111 | A1* | 2/2002 | Koshi ........................... 385/24 |

FOREIGN PATENT DOCUMENTS

| | | |
|---|---|---|
| JP | 61-172389 | 8/1986 |
| JP | 10-164019 | 6/1998 |
| JP | 2000-068931 | 3/2000 |
| JP | 2000-295174 | 10/2000 |
| JP | 2002-152141 | 5/2002 |
| JP | 2002-281095 | 9/2002 |

OTHER PUBLICATIONS

S. Bigo et al., "Improving Spectral Efficiency by Ultra-Narrow Optical Filtering to Achieve Multi-Terabit/s Capacities", OFC 2002, Mar. 17-22, 2002.*

"Optical Networks", second Edition by Ramaswami et al., Academic Press, 2002, Published Oct. 12, 2001, pp. 28-32 and 139-143.*

"Optical Network: A Practical Perspective" by R. Ramaswami et al., Morgan Kaufmann, 1998, pp. 177-180.*

Y. Miyano, et al., "1.2-Tbit/s (30×42.7-Gbit/s ETDM Optical Channel) WDM Transmission Over 376 km with 125-km Spacing Using Forward Error Correction and Carrier Suppressed RZ Format", OFC2000, PD26-1-3 (2000).

T. Miyano, et al., "Suppression of Degradation Induced by SPM/XPM+GVD in WDM Transmission Using A Bit-Synchronous Intensity modulated DPSK Signal", OECC2000, 14DM3-3 (2000).

T. Tsuritani, et al., "Study on 20Gbit/s-based WDM transmission using bandlimited RZ Optical Signals Generated with Optical Filter", OCS2001-28 (with partial translation) (2001).

T. Ito, et al., 6.4 Tb/s (160×40 Gb/s) WDM Transmission Experiment With 0.8 bit/s/Hz Spectral Efficiency ECOC2000, PD1.1 (2000).

Y. Frignac, et al., "Transmission of 256 Wavelength-Division And Polarization-division-multiplexed Channels at 42.7Gb/s (10.2Tb/s capacity) over 3×100km of Teralight™ Fiber", OFC2002, Postdeadline Papers FC5-1 (2002).

P. Le Roux, et al., ."25 GHz Spaced DWDM 160×10.66 Gbit/s (1.6Tbit/s) Unrepeatered Transmission Over 380Km", ECOC2001, PDM1.5 (2001).

H. Ooi, et al., "3.5-Tbit/s (43-Gbit/s×88 ch) Transmission Over 600-km NZDSF With VIPA Variable Dispersion Compensatiors", OFC2002, ThX3 (2002).

Cover page of Japanese Office Action for corresponding Japanese Patent Application 2002-191346 issued on Jul. 31, 2007.

Tsuritanti, T. et al., "Transmission characteristics of vestigial-sideband RZ optical signal in long-haul WDM systems," Proceedings 2 of 2001 Society Conference of the Institute of Electronics, Information, and Communication Engineers, Aug. 29, 2001, Tokyo, Japan.

Toshitaro Ito, et al., "Ultra high density WDM transmission equipment using optical duobinary coding and polarization interleave multiplexing" Proceedings of the 1997 IEICE General Conference Mar. 24 to 27, 1997, Kansai University.

T. Ono, et al., "Comparison of high density WDM characteristics for optical duobinary signal and intensity modulation signal" Proceedings of the 1997 IEICE General Conference Mar. 24 to 27, 1997, Kansai University.

Japanese Office Action issued on Mar. 17, 2009 in corresponding Japanese Patent Application 2002-191346.

* cited by examiner

B/l = 1.72 bit/s/Hz
n=1.2

B/l = 1.72 bit/s/Hz
n=1.3

B/I = 1.72 bit/s/Hz
n=2.0

B/I = 1.72 bit/s/Hz
n=3.0

B/I – 1.72 bit/s/Hz
n=4.0

WAVELENGTH DIVISION MULTIPLEXING OPTICAL TRANSMISSION SYSTEM, AND WAVELENGTH DIVISION MULTIPLEXING OPTICAL TRANSMISSION METHOD

BACKGROUND OF THE INVENTION (1) Field of the Invention

The present invention relates to a wavelength division multiplexing (WDM) optical transmission system and a WDM optical transmission method, for multiplexing a plurality of signal light with different wavelengths and transmitting them in an identical optical fiber to realize a large capacity communication. In particular, the present invention relates to a technique for multiplexing each signal light at a high density for transmission.

(2) Description of Related Art

In order to increase transmission capacity of a WDM optical transmission system, it is necessary to reduce frequency spacing (wavelength spacing) as narrower as possible, and to multiplex many wavelengths at a high density. However, a spectrum or signal light has width depending on a bit rate of the signal light, and the spectrum width limits the frequency spacing.

The abovementioned signal light spectrum width depends not only on the bit rate but also on a modulation and demodulation system. Following systems are known, for example, as modulation and demodulation systems used for the WDM optical transmission system.

(1) Intensity Modulation—Direct Detection (IM-DD) System using an NRZ Modulation Type (2) Intensity Modulation—Direct Detection (IM-DD) system using an RZ Modulation Type (3) CS-RZ (Carrier Suppressed-R7) Modulation—direct Detection System (for example, refer to "1.2-Tbit/s (30× 42.7-Gbit/s ETDM optical channel) WDM transmission over 376 km with 125-km spacing using forward error correction and carrier-suppressed RZ format", by Y. Miyamoto, OFC2000 PD26, and the like)

(4) BSIM-DPSK Modulation—Direct Detection System (for example, refer to "Suppression of degradation induced by SPM/XPM+GVD in WDM transmission using a bi-synchronous intensity modulated DPSK signal", by T. Miyano, OECC2000 14D3-3, and the like)

(5) VSB Modulation—Direct Detection System (for example, refer to "Study on '20 Gbit/s WDM transmission by band reduction RZ optical signal using optical filter", by T. Tsuritani, OCS2001-28, and the like)

Among these modulation systems, the system (1) is the most widely used for actual products. The systems (2) to (4) each have an advantage of a higher resistance to OSNR than the system (1). However, since the signal light has the wider spectrum, there is a disadvantage from the viewpoint of high density multiplexing. Further, the system (5) has a narrower signal light spectrum than the system (1), which is advantageous from the viewpoint of high density multiplexing, but has a disadvantage in that a constitution of optical sender is complicated.

Moreover, as a measure for making the WDM signal light to be at a high density, for example, a technique based on the following polarization control is proposed in addition to the techniques described above centered on the modulation and demodulation system.

(6) Orthogonal Polarization Transmission Technique (refer to "6.4 Tb/s (160×40 Gb/s) WDM Transmission Experiment with 0.8 bit/s/Hz Spectral Efficiency", by T. Ito, ECOC2000 PD1.1, and the like)

(7) Polarization Division Multiplexing Transmission Technique (for example, refer to "Transmission of 256 wavelength-division and polarization-division-multiplexed channels at 42.7 Gb/s (10.2 Tb/s capacity) over 3×100 km of TeraLight™ fiber", by Y. Frignac, OFC2002 Post Deadline Papers FC5-1, and the like)

Incidentally, spectrum efficiency is known as an index for representing the high density of WDM signal light. This spectrum efficiency is defined by a value (B/S) obtained by dividing a bit rate B per one wave by frequency spacing S.

For example, in the intensity modulation-direct detection (IM-DD) system using a normal NRZ modulation type as described in (1), even in the case where neither the orthogonal polarization transmission technique as described in (6) nor the polarization division multiplexing transmission technique as described in (7) is used, the maximum spectrum efficiency of 0.4 bit/s/Hz is achieved. To be specific, there are reported a case where signal light of 10 Gbit/s per one wave is multiplexed at 25 GHz spacing (for example, refer to "25 GHz spaced DWDM 160×10.66 Gbit/s (1.6 Tbit/s) Unrepeatered Transmission over 30 km", by P. Le Roux, ECOC2001 PDM1.5, and the like), or a case where signal light of 40 Gbit/s per one wave is multiplexed at 100 GHz spacing (for example, refer to "3.5 Tbit/s (43 Gbit/s×88 ch) transmission over 600-km NZDSF with VIPA variable dispersion compensators", by H. Ooi, OFC2002 ThX3, and the like).

Further, at a research level, the spectrum efficiency of over 0.4 bit/s/Hz has been realized by applying techniques regarding polarization control as described in (6) and (7) to the VSB modulation-direct detection system as described in (5).

However, in order to realize the aforementioned orthogonal polarization transmission technique and polarization division multiplexing transmission technique, since assembly becomes very complicated as the number of parts in an optical sender and an optical receiver increase, there is a problem in that size and cost are increased. Therefore, it is required to realize the spectrum efficiency of over 0.4 bit/s/Hz without performing orthogonal polarization transmission and polarization division multiplexing transmission by a constitution using a small sized and low cost optical sender and optical receiver, to achieve a large capacity system.

A major problem in achieving an increase in spectrum efficiency is that the Q-value is degraded due to cross-talk between optical signals. That is, even though the spectrum efficiency can be increased to expand the transmission capacity, if as a result, the Q-value is degraded and a transmission distance shortened, there is a case where market demands cannot be satisfied.

In order to discuss system performance from such a viewpoint, it is effective to use not only the spectrum efficiency but also, for example, the product of transmission distance, and transmission capacity (hereunder referred to as transmission distance-capacity product) as performance indexes, and in the system designing, maximization of the above-described transmission distance-capacity product is an important task. In order to maximize the transmission distance-capacity product, it is important to suppress the Q-value degradation due to cross-talk between optical signals.

SUMMARY OF THE INVENTION

The present invention has been accomplished the above-described problems, with an object of providing an optical transmission system and an optical transmission method, that specifies a transmission condition capable of obtaining simultaneously high spectrum efficiency and large transmission distance-capacity product, and uses small sized and low cost optical senders and optical receivers, to realize a high density wavelength division multiplexing optical transmission.

In order to achieve the above deceived object, according to one aspect of the present invention, there is provided a WDM optical transmission system wherein each signal fight with different wavelengths output from a plurality of optical senders is multiplexed by an optical multiplexer to be transmitted to an optical transmission path, and WDM signal light propagated through the optical transmission path is demultiplexed depending on respective wavelengths by an optical demultiplexer to be received by a plurality of optical receivers. In this WDM optical transmission system, each of the plurality of optical senders generates signal light in which a bit rate and frequency spacing thereof are set so as to approach spectrum efficiency at which the product of a transmission distance and a transmission capacity (transmission distance-capacity product) becomes a maximum value. The transmission distance-capacity product is calculated based on the determination of the type of modulation of signal light and also the assumption of an equation model expressing transmission characteristics of the optical multiplexer and optical demultiplexer. Further, the optical multiplexer and the optical demultiplexer have transmission characteristics in which transmission bandwidth is set in accordance with the above described equation model, and also according to the spectrum efficiency at which the transmission distance-capacity product becomes the maximum value.

In the WDM optical transmission system having such a constitution, the spectrum efficiency at which the transmission distance-capacity product becomes the maximum value is specified by calculation, and the bit rate and frequency spacing of the signal light output from each optical sender, and also the transmission characteristics of the optical multiplexer and the optical demultiplexer, are optimized so as to approach that spectrum efficiency. This enables an increase in transmission distance-capacity product to be achieved while realizing high spectrum efficiency, without applying the orthogonal polarization transmission or the polarization division multiplexing transmission. Therefore, it becomes possible to provide a large capacity optical transmission system in which a high density wavelength multiplexing optical transmission is realized using low cost and small sized optical senders and optical receivers.

In the above described WDM optical transmission system, the type of signal light modulation may be an NRZ modulation type and the equation model expressing the transmission characteristics of the optical multiplexer and the optical demultiplexer may be the one in which the shape of each transmission band corresponding to the wavelength of each signal light is expressed, using a frequency f, the center frequency fc of the transmission band, full width at half maximum $\Delta f$ of the transmission band, and a filter order "n", in the following equation.

$$T(f) = 10 \cdot \log\left[\exp\left\{-2 \cdot \ln\sqrt{2} \cdot \left(\frac{|f - fc|}{\Delta f/2}\right)^{2n}\right\}\right] \text{ (dB)}$$

In this case, if the filter order "n" is secondary, then the spectrum efficiency at which the transmission distance-capacity product becomes the maximum value is 0.574 bit/s/Hz.

Further, when the bit rate B and frequency grid I per one wave of the signal light are given in advance, a natural number "k" may be selected so as to minimize a difference between the spectrum efficiency B/(kI) where k is the natural number, and the spectrum efficiency at which the transmission distance-capacity product becomes the maximum value, so that frequency spacing S=kI, of the signal light is set in accordance with the natural number "k".

According to another aspect of the present invention, there is provided a WDM optical transmission system including a wavelength multiplexing apparatus for multiplexing optical signals with a plurality of wavelengths to output to a transmission path, and a wavelength demultiplexing apparatus for demultiplexing wavelength division multiplexed light from the transmission path, wherein the wavelength multiplexing apparatus and the wavelength demultiplexing apparatus eliminate each component on a short wavelength side and a long wavelength side of the spectrum of each optical signal, using a filter with a narrower band than spectrum width obtained based on a bit rate of the optical signal and the type of coding, and make the spacing between the optical signals to be narrower than the above described spectrum width. Further, it is possible to constitute the wavelength multiplexing apparatus and the wavelength demultiplexing apparatus by polarization independent optical parts. In the system having such a constitution, it is also possible to increase the transmission distance-capacity product while realizing high spectrum efficiency, without applying the orthogonal polarization transmission or the polarization division multiplexing transmission.

As one aspect of a WDM optical transmission method, the present invention provides a method or multiplexing a plurality of signal light with different wavelengths to transmit to an optical transmission path, and demultiplexing wavelength division multiplexed signal light propagated through the optical transmission path according to wavelength to receive, wherein spectrum efficiency at which the product of a transmission distance and a transmission capacity becomes a maximum value is calculated based on the determination of the type of modulation of signal light and also the assumption of an equation model expressing transmission characteristics at the time of multiplexing and demultiplexing the signal light, a bit rate and frequency spacing of the signal light are set so as to approach the spectrum efficiency at which the product of the transmission distance and the transmission capacity becomes the maximum value, and also actual transmission characteristics at the time of multiplexing and demultiplexing the signal light is set in accordance with the above described equation model, to transmit the wavelength division multiplexed signal light.

As another aspect of the WDM optical transmission method, the present invention provides a method of generating a plurality of optical signals obtained by modulating a plurality of light with different wavelengths, eliminating each component on a short wavelength side and a long wavelength side of spectrum of each optical signal to make each optical signal to have predetermined bandwidth, and wavelength division multiplexing each optical signal at the predetermined bandwidth to transmit wavelength division multiplexed signal light.

Other objects, features, and advantages of this invention will become apparent in the following description of embodiments in relation to the accompanying drawings.

DETAILED DESCRIPTION OF THE INVENTION

Hereunder is a description of embodiments of the present invention based on drawings.

Firstly, Q-value degradation due to cross-talk between optical signals, which occurs when improving spectrum efficiency, will be described with reference to FIG. 1 to FIG. 3, which is useful for understanding features of an optical transmission system of the present invention.

Figure 1:
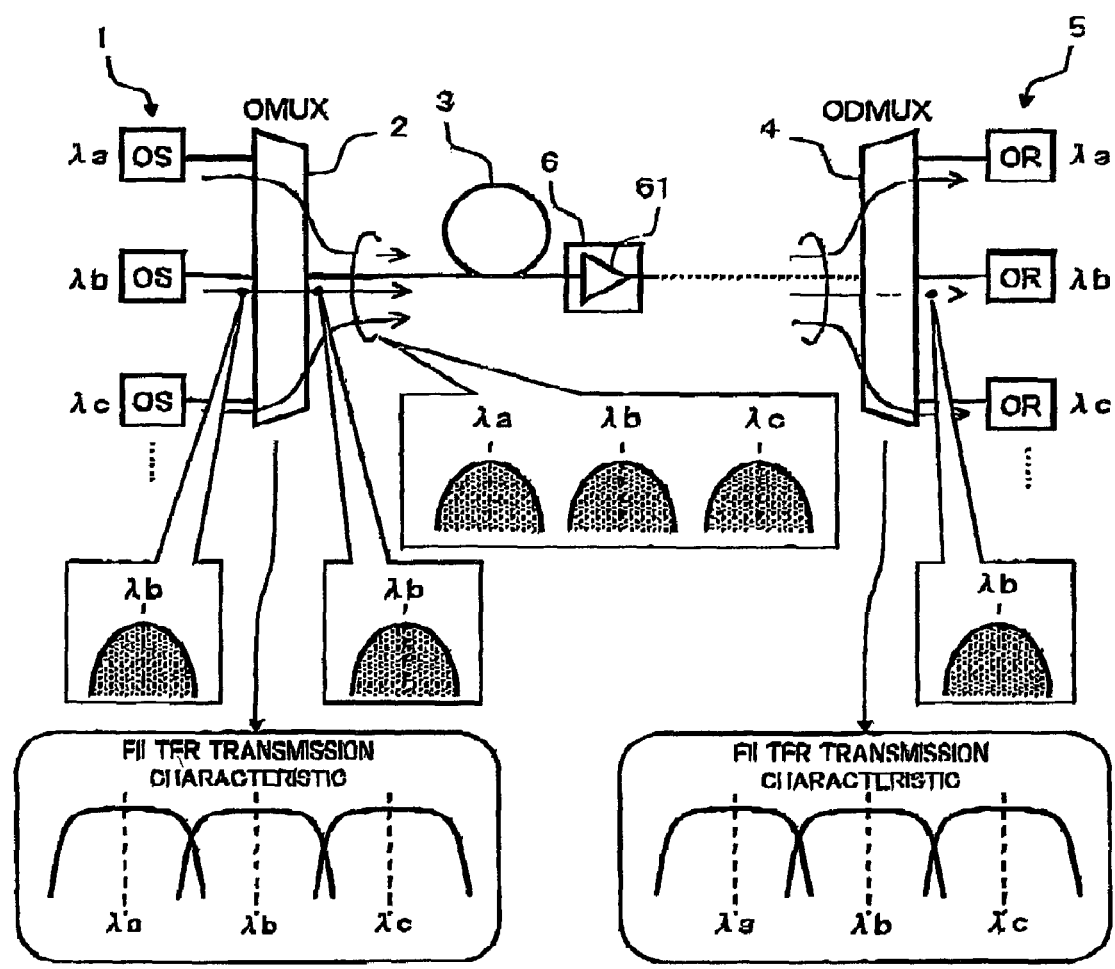
FIG. 1 is a diagram showing an example of signal light spectrum in the case where frequency spacing is set to be wide in a typical WDM optical transmission system.

Here, as shown in FIG. 1 for example, it is assumed a case where, in an optical transmission system in which each signal light with wavelengths λa, λb, λc, . . . output from a plurality of optical senders (OS) 1 is multiplexed by an optical multiplexer (OMUX) 2 to be transmitted to an optical transmission path 3, and WDM signal light propagated while being amplified by an optical repeater 6 disposed on the optical transmission path 3 is demultiplexed for each wavelength by an optical demultiplexer (ODMUX) 4 to be received by each corresponding optical receiver (OR) 5, frequency spacing (wavelength spacing) of each signal light is set to be wide, and filter characteristics corresponding to the wavelengths λa, λb, λc, . . . of the optical multiplexer Z and the optical demultiplexer 4 are set so as to have wide transmission bandwidth. Note, the optical multiplexer 2 corresponds to a wavelength multiplexing apparatus, and the optical demultiplexer 4 corresponds to a wavelength demultiplexing apparatus.

In this case, each signal light output from each optical sender 1 is multiplexed in the optical multiplexer 2 at wider spacing than each spectrum width without a change in the shape of the spectrum, to be transmitted to the optical transmission path 8. Accordingly, the signal light spectrums of the respective wavelengths do not overlap with each other, hence fundamentally no Q-value degradation occurs due to cross-talk between each signal light.

Figure 2:
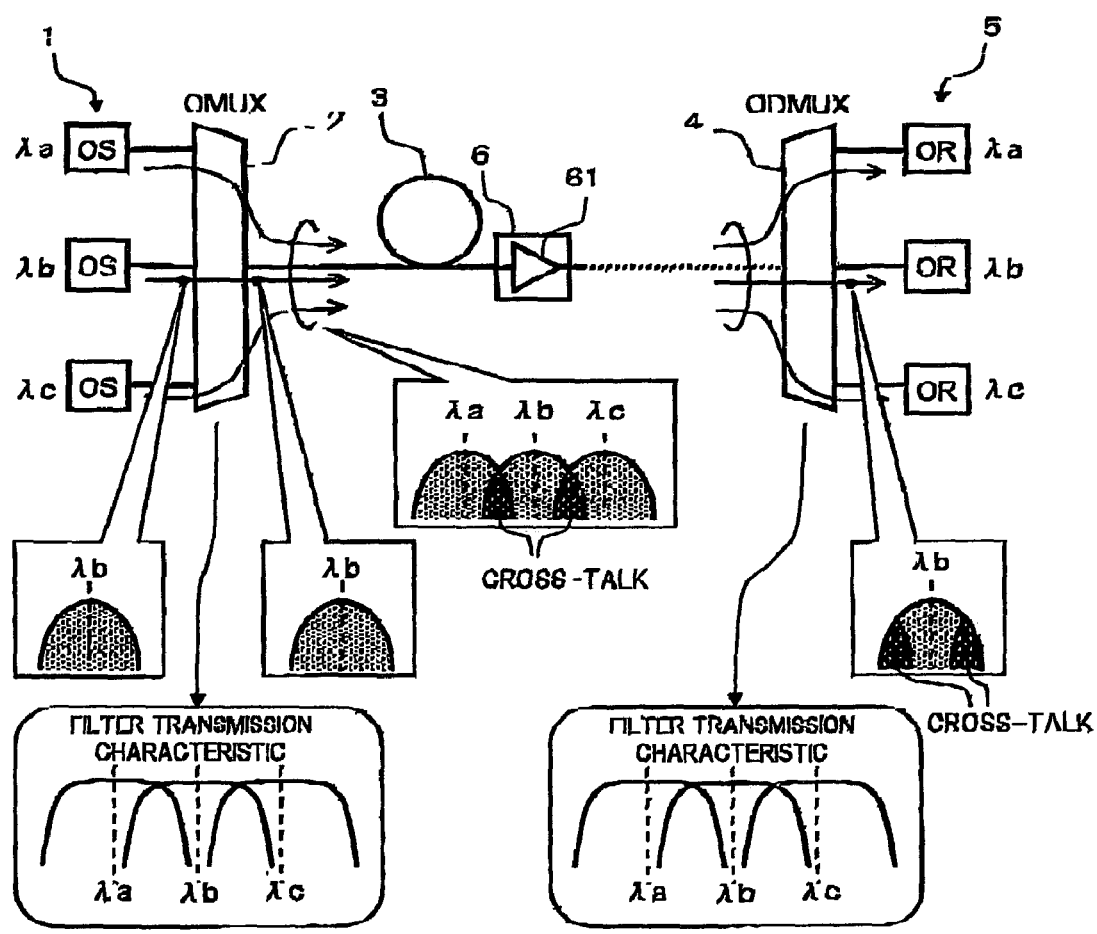
FIG. 2 is a diagram showing an example of signal light spectrum in the case where frequency spacing is to be narrow in the typical WDM optical transmission system.

Compared with the above described WDM optical transmission system with comparatively wide frequency spacing, in a system of the case of narrow frequency spacing as shown in FIG. 2 for example, since the spectrum of adjacent wavelengths of each signal light that has been multiplexed by the optical multiplexer 2 overlap with each other, cross-talk occurs between each signal light, thus causing the Q-value degradation. In order to avoid the Q-value degradation due to such cross-talk, as shown in FIG. 3 for example, a method in which a high frequency component of the spectrum of each signal light is sliced by the optical multiplexer 2 and the optical demultiplexer 4 in effective.

Figure 3:
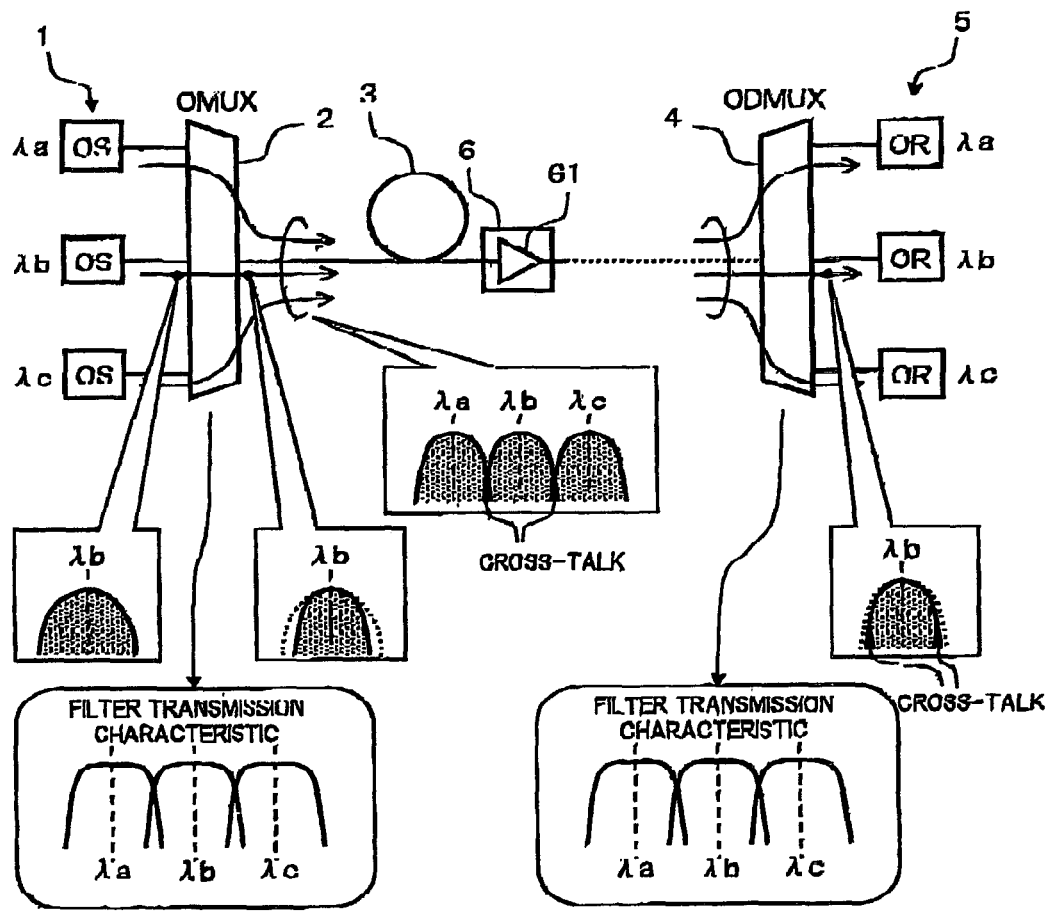
FIG. 3 is a diagram showing an example of the case where the signal light spectrum is sliced in the system of FIG. 2.

However, in the optical transmission system of FIG. 3, if the high frequency component of the spectrum of each signal light is sliced too much by the optical multiplexer 2 and the optical demultiplexer 4, there is also a possibility that significant Q-value degradation occurs anyway. Further, it has been confirmed that if the frequency spacing is too small relative to the spectrum width according to the bit rate, then the effect cannot be obtained.

Therefore, the present invention provides a specific technique for optimizing the bit rate and frequency arrangement of WDM signal light, and the filter characteristics of the optical multiplexer 2 and the optical demultiplexer 4, in order to realize an optical transmission system capable of minimizing the Q-value degradation at high spectrum efficiency. Hereunder is a detailed description of the optimization technique of the present invention.

Figure 4:
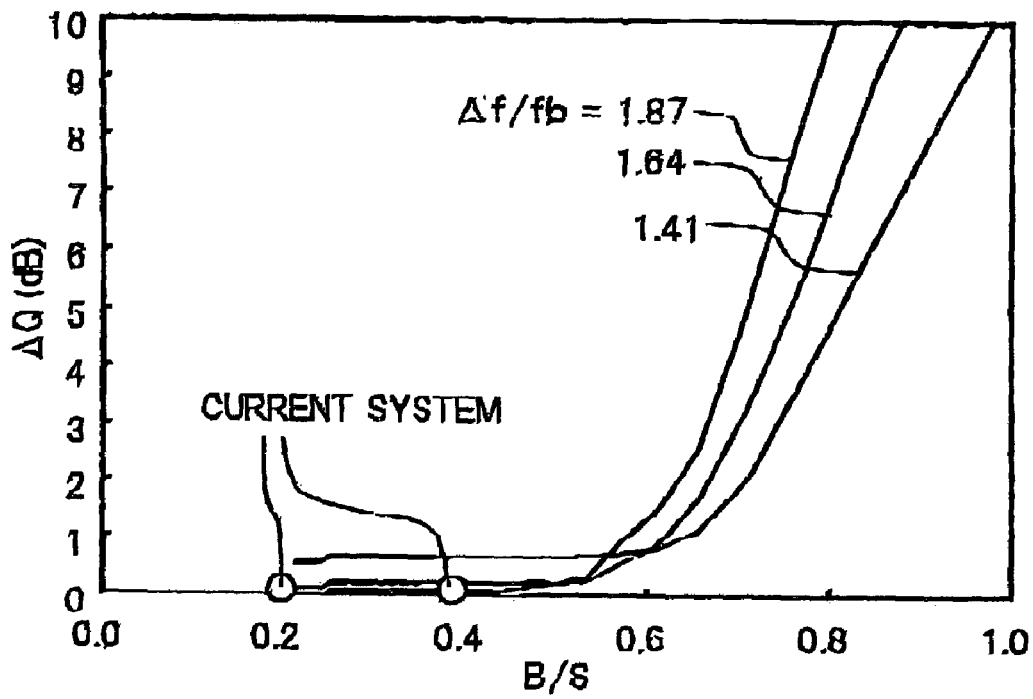
FIG. 4 is a graph showing an example in which a Q-value degradation amount ΔQ with respect to a change in spectrum efficiency B/S is calculated.

FIG. 4 is a diagram showing an example in which a Q-value degradation amount $\Delta Q$ with respect to a change in spectrum efficiency B/S is calculated. In this calculation example, since it is assumed that the same system structure as those shown in FIG. 1 to FIG. 3 is used, and that the orthogonal polarization or the polarization division multiplexing is not performed, the polarization state for all signal light is assumed to be the same (worst case). Further, to simplify the description, the Q-value degradation of the central wavelength is evaluated with the number of wavelengths of the WDM signal light being 8 waves.

Moreover, the above described Q-value degradation amount $\Delta Q$ is assumed to be defined by the following equation (1) where the Q-value when transmitting one wave is $Q_0$, and the Q-value of the central wavelength when transmitting 8 waves is Q.

$$\Delta Q = 20 \cdot \log \frac{Q}{Qo} \quad (dB) \quad (1)$$

Factors to determine this Q-value degradation amount $\Delta Q$ are the signal light spectrum between adjacent wavelengths, and the filter characteristics (transmission characteristics) of the optical multiplexer 2 and the optical demultiplexer 4. Therefore, even if the number of wavelengths are increased or decreased, the calculation result of $\Delta Q$ is not changed.

In addition, for the filter characteristics of the optical multiplexer 2 and the optical demultiplexer 4 used when calculating the Q-value degradation amount $\Delta Q$, the shape of the transmission characteristics of the optical multiplexer 2 and the optical demultiplexer 4 corresponding to the wavelength of each signal light are assumed by a function shown in the following equation (2), for example, for modeling actual filter characteristics.

$$T(f) = 10 \cdot \log\left[\exp\left\{-2 \cdot \ln\sqrt{2} \cdot \left(\frac{|f - fc|}{\Delta f / 2}\right)^{2n}\right\}\right] \quad (dB) \quad (2)$$

In the above equation, fc is the central frequency of the transmission band, $\Delta f$ is the full width at half maximum, "n" is the number of the relative equation, and by setting n=2 here, the equation corresponds to a function type called secondary super Gaussian. For the full width at halt maximum $\Delta f$, a required value may be previously set according to the signal light spectrum. Or the full width at half maximum $\Delta f$ may be optimized according to the change in the spectrum efficiency B/S.

As shown in the calculation result in FIG. 4, it can be seen that, if the spectrum efficiency B/S is increased over about 0.6 bit/s/Hz, the Q-value degradation amount $\Delta Q$ is increased rapidly. Main factors of this Q-value degradation are considered to be the cut off of the signal light spectrum by the optical multiplexer 2 and the optical demultiplexer 4, and cross-talk between each signal light. Further, as is clear from changes in the characteristics when changing a value $\Delta f/fb$ obtained by dividing the transmission bandwidth $\Delta f$ (full width at half maximum) corresponding to each wavelength of the optical multiplexer 2 and the optical demultiplexer 4, by a clock frequency fb of the signal light, the Q-value degradation amount $\Delta Q$ is varied depending on the bandwidth $\Delta f$ of the filter.

Next is a detailed description of the transmission distance-capacity product serving as a performance index of the aforementioned system.

As typical transmission characteristics, in case of an optical multistage repeater transmission system in which optical repeaters are almost equally spaced, a transmission distance thereof is almost proportional to $10 \cdot (-\Delta Q/10)$. Further, in the case where the wavelength bandwidth of WDM signal light (WDM bandwidth) 1 assumed to be constant, a transmission capacity is proportional to the spectrum efficiency B/S. That is, the transmission capacity C can be expressed as $C=N \cdot B=(W/S) \cdot B=W \cdot (B/S)$ using the number of wavelengths N of the WDM signal light, the bit rate B per one wave, WDM bandwidth W, and frequency spacing S, and is proportional to the spectrum efficiency B/S. Accordingly, if $10 \cdot (-\Delta Q/10) \cdot B/S$ can be maximized, the transmission distance-capacity product can be also maximized. Therefore, in the present invention, the value of $10 \cdot (-\Delta Q/10) \cdot B/S$ (referred to hereunder as performance index PI) is focused, to achieve the optimization of the bit rate and frequency arrangement of WDM signal light, and of the filter characteristics of the optical multiplexer 2 and the optical demultiplexer 4.

Figure 5:
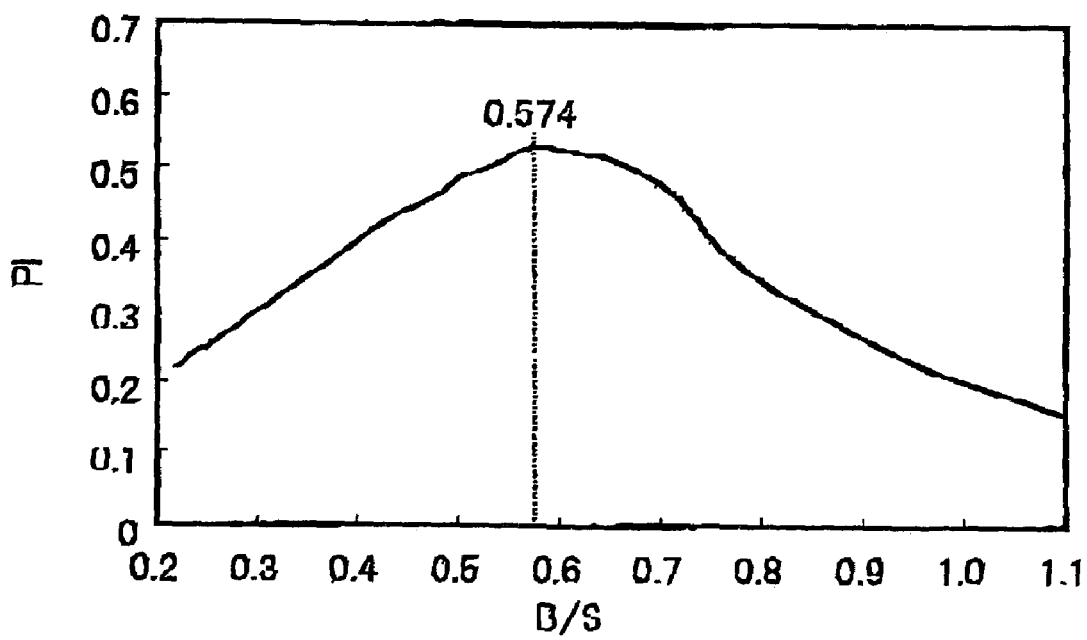
FIG. 5 is a graph explaining a technique for optimization according to the present invention, which shows an example in which a relationship of a performance index PI to spectrum efficiency B/S is obtained.

FIG. 5 is a graph showing an example in which a relationship of the performance index PI to the spectrum efficiency B/S is obtained by calculation.

Conditions to obtain the relationship of FIG. 5 are to assume an equation model regarding the filter characteristics of the optical multiplexer 2 and the optical demultiplexer 4, and to determine the type of signal light modulation. Here, the secondary super Gaussian as shown in the equation (2) are applied as the filter characteristics for example, and NRZ modulation is applied as the type of signal light modulation for example, to calculate the relationship of the performance index PI to the spectrum efficiency B/S.

Figure 6:
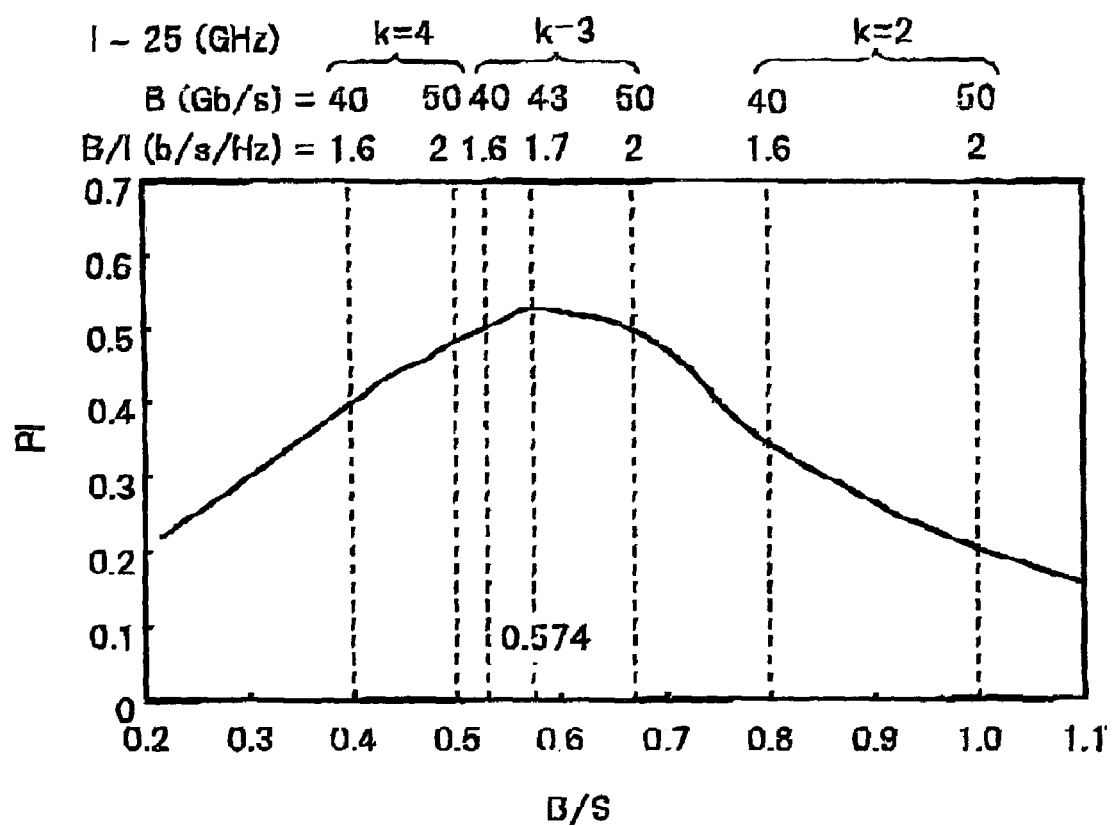
FIG. 6 is a graph showing results of analysis when the calculation results of FIG. 5 are corresponded to frequency grid spacing of 25 MHz and bit rates of 40 to 50 Gbit/s.

As shown in the calculation result of FIG. 6, it can be seen that, by determining the conditions of the equation model regarding the filter characteristics and the type of signal light modulation, the performance index PI becomes maximum when a specific value of the spectrum efficiency B/S is obtained. To be specific, in the case where the secondary super Gaussian is applied as the filter characteristics, and the NRZ modulation is applied as the type of signal light modulation, if the spectrum efficiency B/S is in the vicinity of 0.574 bits/Hz, the performance index PI becomes maximum, that is the transmission distance-capacity product becomes maximum. Accordingly, by optimizing the bit rate and frequency arrangement of WDM signal light actually used, and the filter characteristics of the optical multiplexer 2 and the optical demultiplexer 4, so as to approach the spectrum efficiency B/S that maximizes the performance index PI, it becomes possible to design an optical transmission system that realizes simultaneously high spectrum efficiency and the large transmission distance-capacity product.

Incidentally, the central frequency (central wavelength) of signal light used in a WDM optical transmission system has been discussed at the ITU for example, and currently an ITU grid of up to 25 GHz spacing has been adopted as a standard. Normally, optical parts such as a tunable laser used as an optical source of the optical sender 1 are produced based on the ITU grid. Therefore, if a signal light frequency based on the ITU grid is adopted, standard parts based on the ITU that are widely available on the market can be used, thus it becomes possible to realize low cost optical senders.

On the other hand, a bit rate (for example, 10 Gbit/s, 40 Gbit/s, etc.) corresponding to SONET/SDH is typically used for an optical transmission apparatus. Further, there is an optical transmission apparatus in which a bit rate equivalent to 1 to 1.25 times as high as the bit rate based on the SONET/SDH can be used, by adopting a known error correction (FEC: Forward Error Correction) technique. In view of such circumstances, for currently assumed bit rates, for example 10 to 12.5 Gbit/s, 20 to 25 Gbit/s, 40 to 50 Gbit/s, 80 to 100 Gbit/s, 160 to 200 Gbit/s and the like can be considered.

One task when designing a WDM optical transmission system is to determine frequency spacing S=kI (k is a natural number) at which the transmission distance-capacity product can approach a maximum value, when the frequency grid I and bit rate B of WDM signal light being transmitted are given. That is, in the calculation example shown in FIG. 5, by selecting the natural number "k" such that the spectrum efficiency B/S approaches 0.574 bit/s/Hz, in other words [B/(kI)−0.574] bit/s/Hz becomes small, it is possible to maximize the transmission distance-capacity product.

To be specific, as shown in FIG. 6 for example, when the frequency grid I=25 GHz interval, and the bit rate B=10 to 50 Gbit/s, the transmission distance-capacity product is maximized with the natural number "k"=3. Particularly, it can be seen that, in the case of the bit rate B=43 Gbit/s, the spectrum efficiency B/S=0.574 bit/s/Hz, so the maximum effect can be obtained.

FIG. 6 shows an example of the frequency grid I=25 GHz interval and the bit rate B=40 to 50 Gbit/s. However, as long as the value B/I is the same, even if the frequency grid I and the bit rate B are changed, the calculation result in FIG. 6 is the same, hence it is applicable to various frequency grids I and bit rates B.

Further, it has been shown specifically in the above example that when the spectrum efficiency B/S=0.574 bit/s/Hz, the transmission distance-capacity product becomes maximum. However, the value of the spectrum efficiency at which the transmission distance-capacity product becomes maximum is changed according to the equation model regarding the filter characteristics and type of signal light modulation, and the value is not limited to the above described value.

A point to be further noted when designing a WDM optical transmission system based on the analysis results as described above is how many optical signals are to be arranged in gain bandwidth of an optical amplifier disposed on an optical transmission path, to increase a transmission capacity. That is, in the optical transmission system as shown in FIG. 1, arrangement of more optical signals in a band having a gain of an optical amplifier 61 that directly amplifies light inside the optical repeater 6 on the transmission path is a key to increase the transmission capacity.

The optical amplifier 61 comprises a rare earth element doped fiber that is doped with a rare earth element, and a pumping light source for pumping the rare earth element doped fiber, and performs optical amplification by a stimulated emission phenomenon due to the light propagated through the transmission path. The gain and the band having this gain of this optical amplifier 61 are determined by the rare earth element and a dopant such as aluminum or the like, to be added to the rare earth element doped fiber. Therefore, if more optical signals can be arranged in the band having the gain of the optical amplifier 61, it becomes possible to achieve an increase in the transmission capacity. On the other hand, as shown in FIG. 1, the spectrum of optical signal is determined according to the encoding system in which light is modulated and a bit rate of the optical signal. If the spectrums between optical signals are overlapped with each other to be multiplexed as shown in FIG. 2, then the transmission characteristic is degraded by cross-talk. Therefore, it will be effective if it is possible to not degrade the transmission characteristic due to cross-talk between optical signals within the gain bandwidth of the optical amplifier 61, and to wavelength multiplex more optical signals than the number of signals obtained by dividing the bandwidth of the optical amplifier by the spectrum determined by the encoding system and the bit rate.

Therefore, in the present invention, as shown in FIG. 3 described above, each component on the short wavelength side and the long wavelength side of the spectrum of the optical signal is eliminated, using an optical filter with bandwidth narrower than the spectrum width obtained by the bit rate and the type of encoding of the optical signal, in the optical multiplexer 2 corresponding to the wavelength multiplexing apparatus on the sending side. Then, each optical signal whose components on the short wavelength side and the long wavelength side have been eliminated is wavelength multiplexed at narrower spacing than the spectrum width obtained by the bit rate and the type of encoding to be transmitted to the transmission path, so that cross-talk does not occur between the spectrums of the optical signals.

Further, in the optical demultiplexer 4 corresponding to the wavelength demultiplexing apparatus, similarly each component on the short wavelength side and the long wavelength side is eliminated using an optical filter with bandwidth narrower than the spectrum width obtained by the bit rate and the type of encoding of the optical signal in the sending section. Then, each optical signal whose components on the short wavelength side and the long wavelength side have been eliminated; wavelength division demultiplexed at narrower spacing than the spectrum width obtained by the bit rate and the type of encoding, so that cross-talk does not occur between the spectrums of the optical signals.

According to such a constitution, it becomes possible to transmit WDM signal light with no occurrence of cross-talk, even without performing the orthogonal polarization between adjacent optical signal channels. That is, by constituting the filters of the wavelength multiplexing apparatus (optical multiplexer) and the wavelength demultiplexing apparatus (optical demultiplexer) corresponding to the spectrums of optical signals, it becomes unnecessary to perform the orthogonal polarization division multiplexing between adjacent optical signal channels, and non-polarized (polarization independent) optical parts can be used to construct filter devices constituting the wavelength multiplexing apparatus and the wavelength demultiplexing apparatus.

Figure 7:
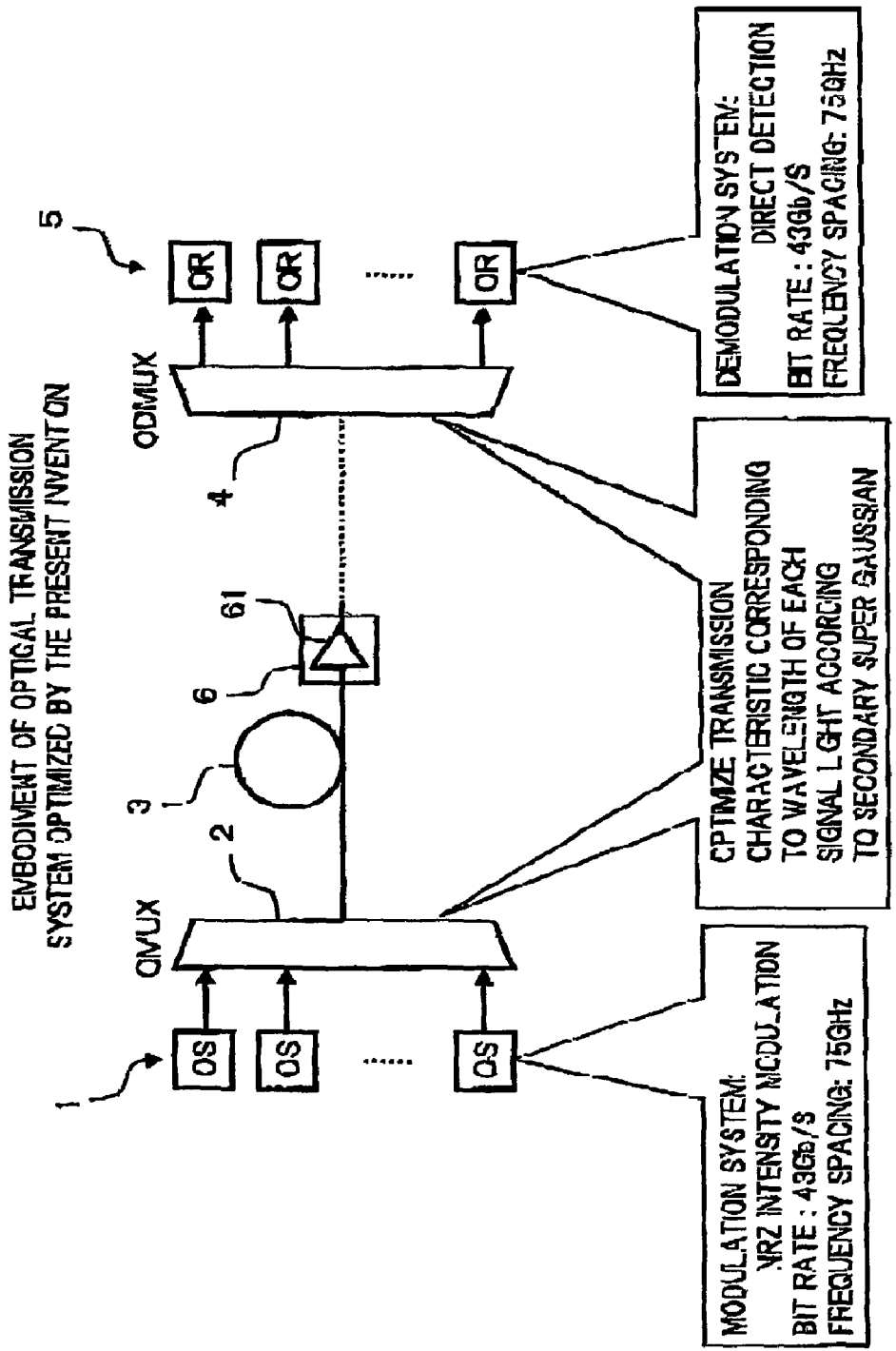
FIG. 7 is a block diagram showing a structural example of a WDM optical transmission system in which optimization is achieved based on the analysis results of FIG. 6.

FIG. 7 is a structural diagram showing an embodiment of the WDM optical transmission system in which optimization is achieved based on the analysis results as described above.

In the WDM optical transmission system as shown in FIG. 7, the wavelength setting and a modulation and demodulation system (specifically, intensity modulation-direct detection (IM-DD) system) of each optical sender 1 and each optical receiver 5 are set in advance, so that signal light of bit rate B=43 Gbit/s, which is intensity modulated by an NRZ method, is arranged on the ITU grid of 25 GHz at the frequency spacing S=kI=3' 25 GHz=75 GHz, to be sent and received. Further, a known optical filter designed so as to exhibit transmission characteristics following the secondary super Gaussian shown in the equation (2) corresponding to the wavelength of each signal light, is used for the optical multiplexer 2 that multiplexes each signal light output from each optical sender 1, and the optical demultiplexer 4 that demultiplexes the WDM signal light propagated through the optical transmission path 3. Using such an optical multiplexer 2 and optical demultiplexer 4, high frequency components of the signal light spectrum can be sliced in optimum conditions. Note, the optical repeater 6 provided with the known optical amplifier 61 is disposed on the optical transmission path 3.

Figure 8:
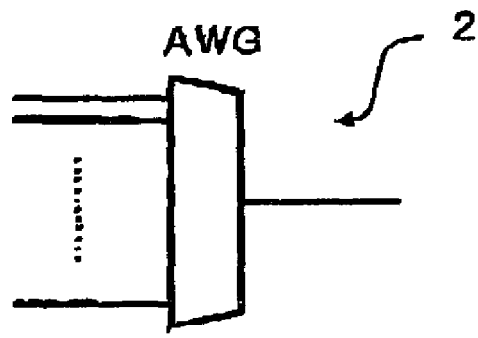
FIG. 8 is a diagram showing a specific example of an optical multiplexer in the structural example of FIG. 7.
Figure 9:
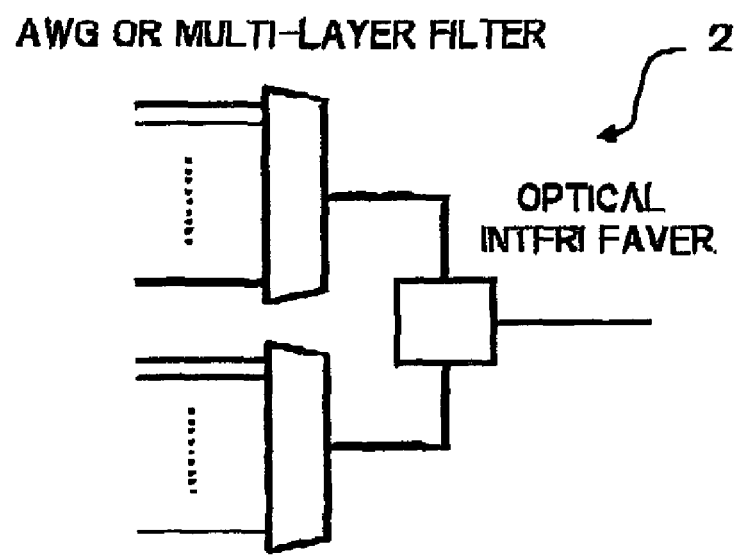
FIG. 9 is a diagram showing another specific example of the optical multiplexer in the structural example of FIG. 7.
Figure 10:
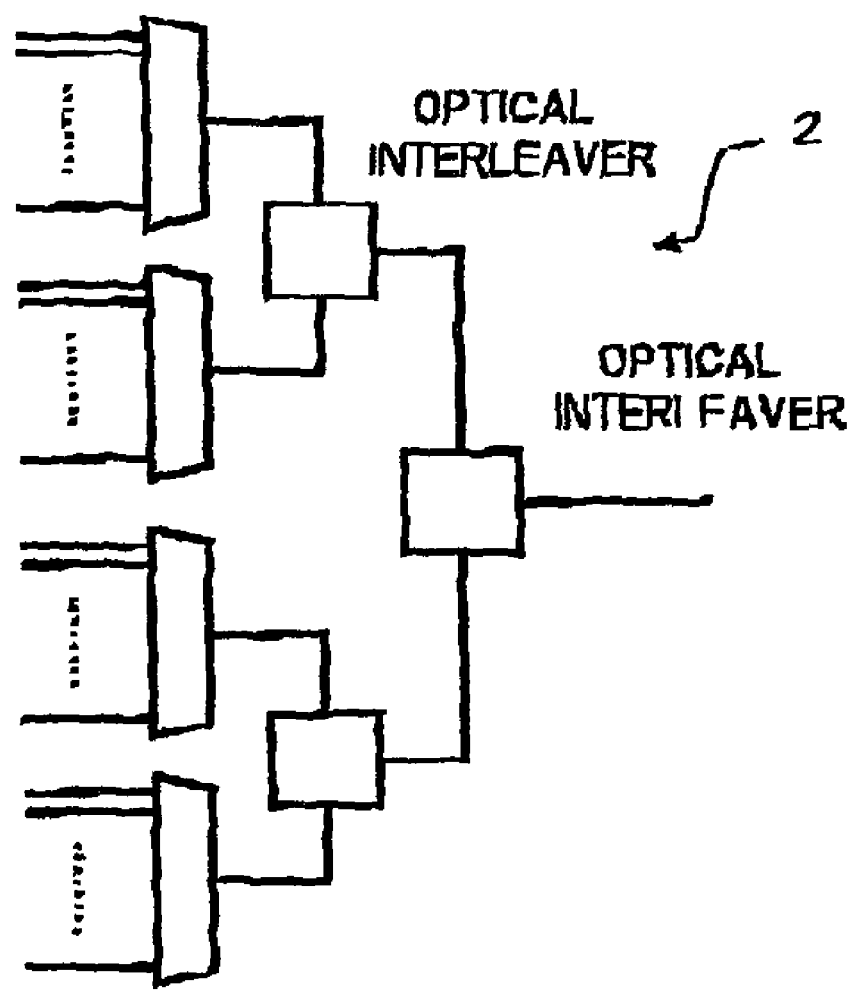
FIG. 10 is a diagram showing a further specific example of the optical multiplexer in the structural example of FIG. 7.
Figure 11:
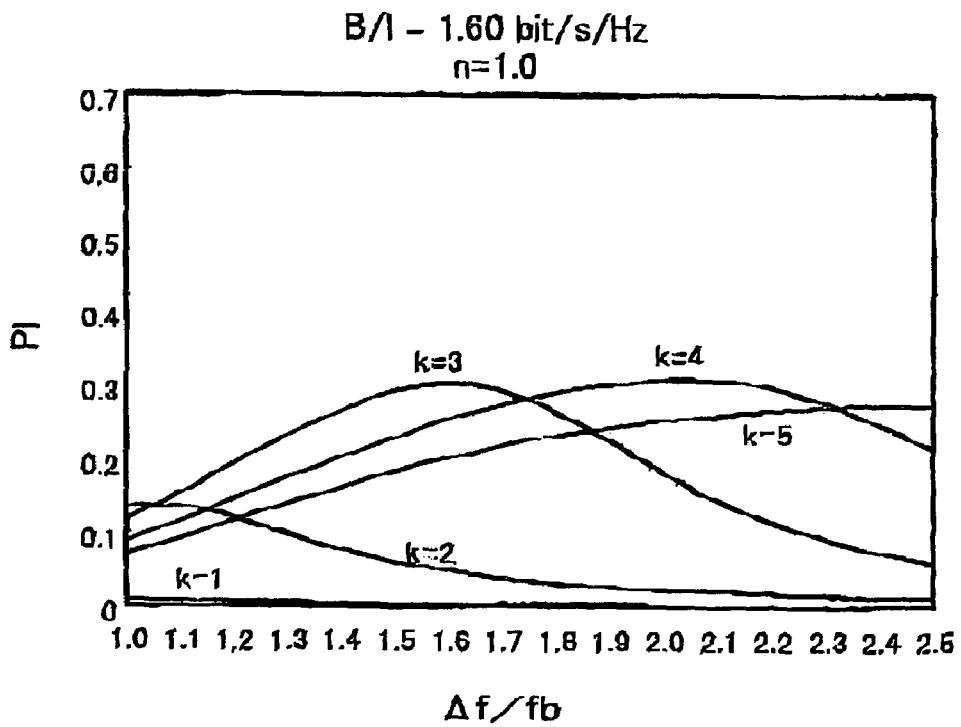
FIG. 11 is a graph showing a relationship of PI to Δf/fb in the case of n=1.0 in a first setting example with B/I=1.60.
Figure 12:
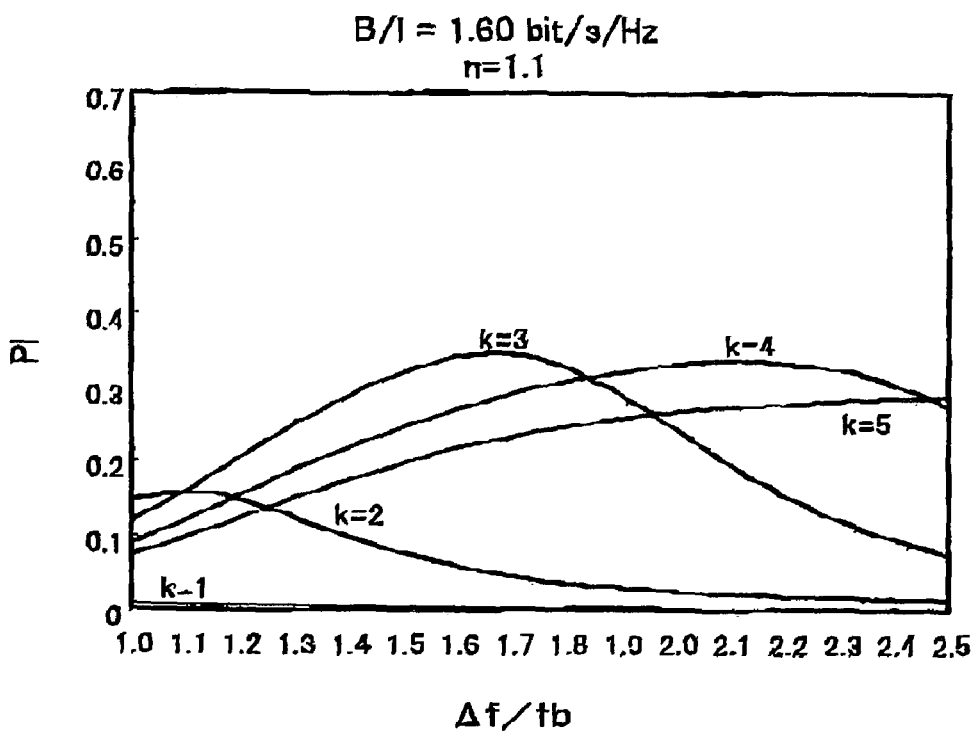
FIG. 12 is a graph showing tho relationship of PI to Δf/fb in the case of n=1.1 in the first setting example with B/I=1.60.
Figure 13:
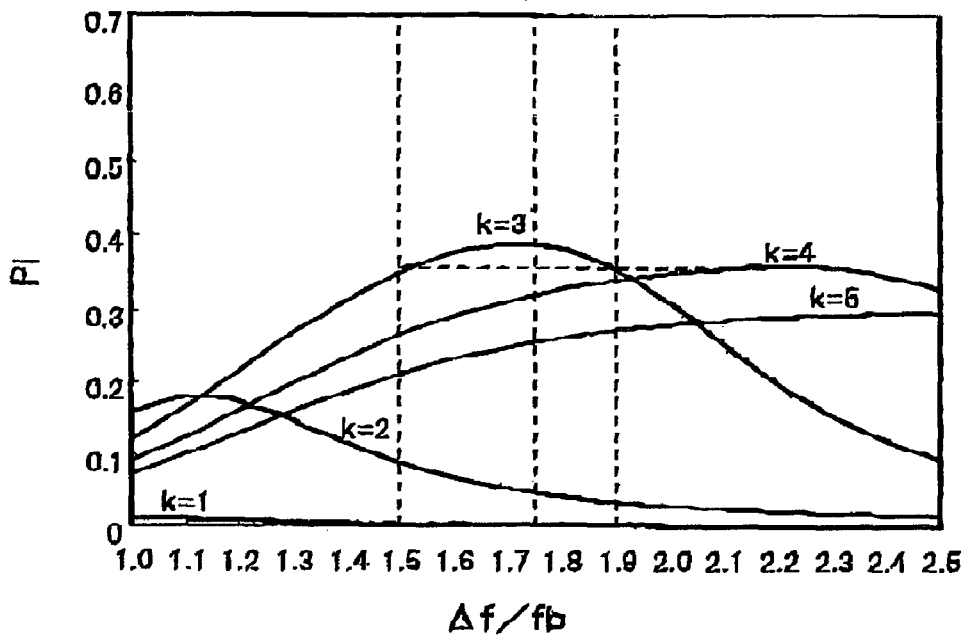
FIG. 13 is a graph showing the relationship of PI to Δf/fb in the case of n=1.2 in the first setting example with B/I=1.60.
Figure 14:
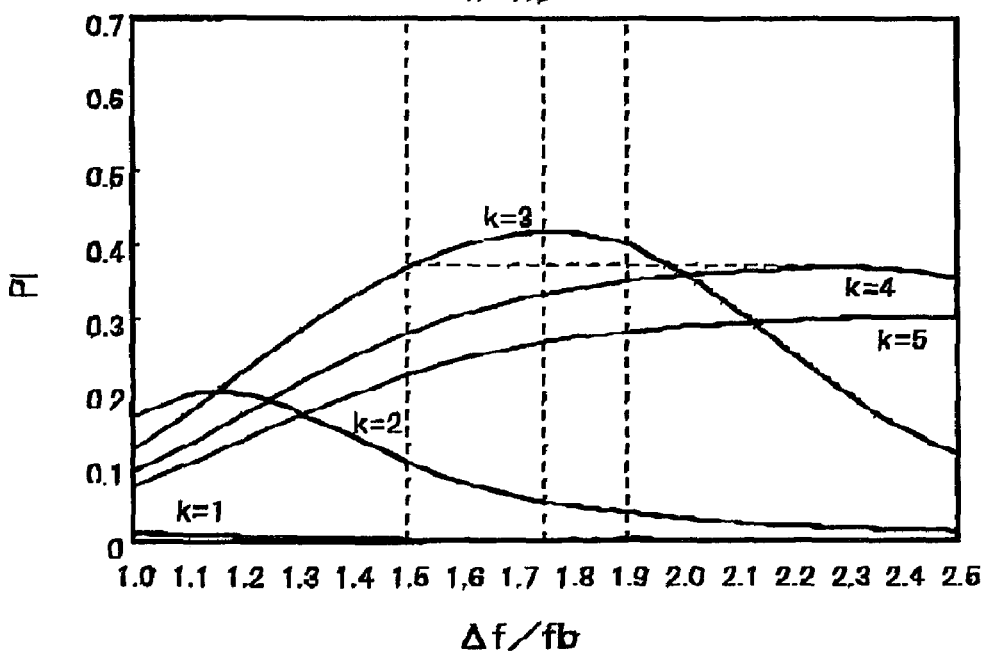
FIG. 14 is a graph showing the relationship of PI to Δf/fb in the case of n=1.3 in the first setting example with B/I=1.60.
Figure 15:
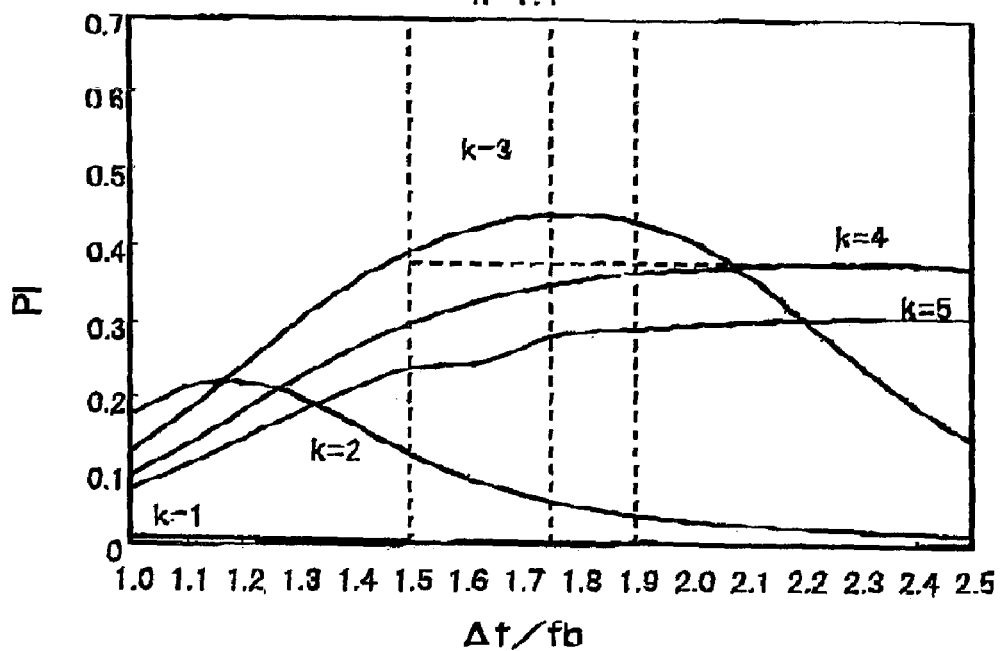
FIG. 15 is a graph showing the relationship of PI to Δf/fb in the case of n=1.4 in the first setting example with B/I=1.60.
Figure 16:
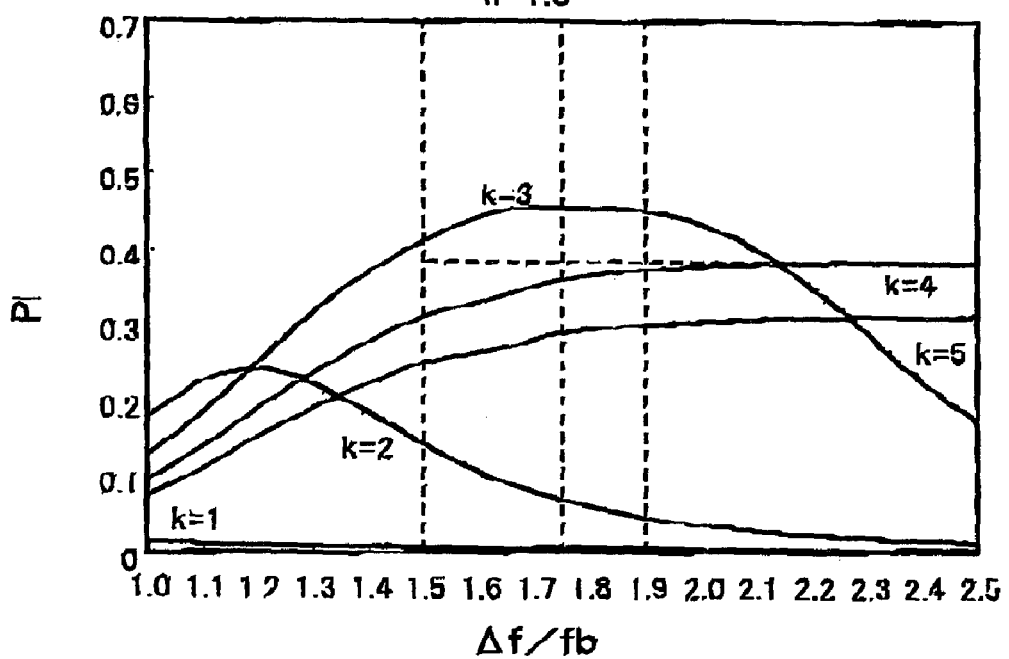
FIG. 16 is a graph showing the relationship of PI to Δf/fb in the case of n=1.6 in the first setting example with B/I=1.60.

For a specific constitution of the optical multiplexer 2 that realizes the transmission characteristic as described above, it is preferable to use, for example, a constitution using an arrayed waveguide grating (AWG) as shown in FIG. 8, a constitution in which an AWG or a dielectric multi-layer film filter and an optical interleaver using an interference filter are combined as shown in FIG. 9, or the like. Further, as shown in FIG. 10, it is also possible to adopt a constitution in which the constitution in FIG. 9 is made to be one unit, and each unit are combined using the optical interleavers. The optical multiplexer 2 as shown in FIG. 8 to FIG. 10 can be constituted using polarization independent optical parts (optical parts that do not hold polarization). Here, the specific constitution of the optical multiplexer 2 has been described. However, the demultiplexer 4 may also be constituted similarly to the optical multiplexer 2.

It is ideal that the transmission characteristics following the secondary super Gaussian that has been assumed in order to obtain the calculation result in FIG. 6, are realized by adopting the constitution as described above. However, it is considered that the filter characteristics obtained actually, may differ from the above assumption. Therefore, analysis of tolerance regarding the filter characteristics of the optical multiplexer 2 and the optical demultiplexer 4 is additionally made hereunder.

Regarding the relationship shown in the equation (2) in the calculation process to obtain the result of FIG. 6, the order "n" is assumed to be the secondary, and the full width at half maximum Δf is fixed at the required value, or optimized according to the spectrum efficiency B/S. Here, by calculating the relationship of the performance index PI to the full width at half maximum Δf while changing stepwise the order "n", specific analysis of the tolerance of the filter characteristics is made.

Firstly, as a first setting example, a case is considered where it is assumed that a ratio B/I of the bit rate B and the frequency grid I of the signal light is set to 1.60 bit/s/Hz. Such a setting condition corresponds to, for example, a case where the bit rate B=40 Gbit/s (SONET signal light of 40 G), and the frequency grid I=25 GHz (ITU grid of 25 GHz interval.

Figure 17:
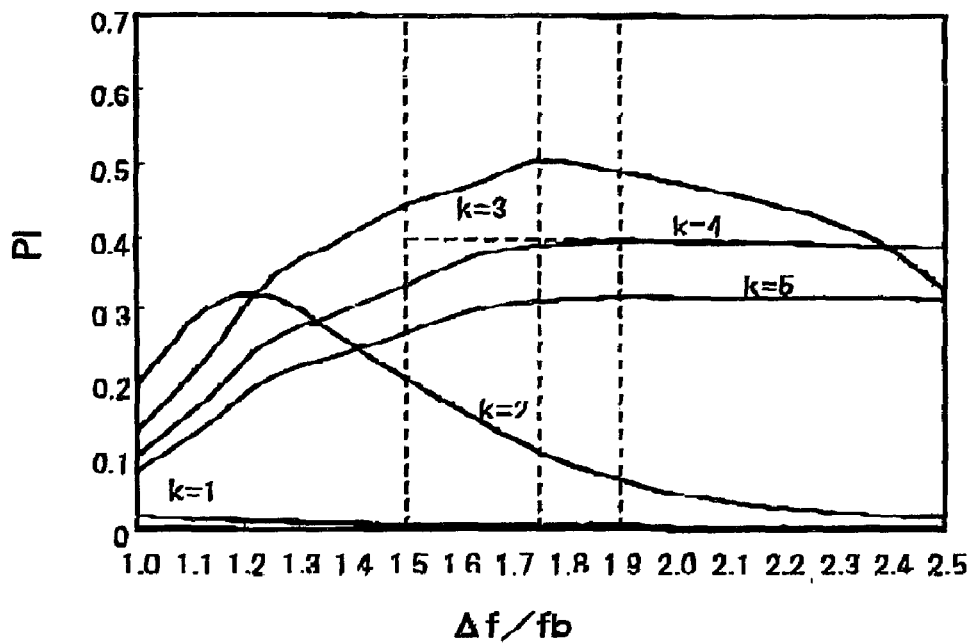
FIG. 17 is a graph showing the relationship of PI to Δf/fb in the case of n=2.0 in the first setting example with B/I=1.60.
Figure 18:
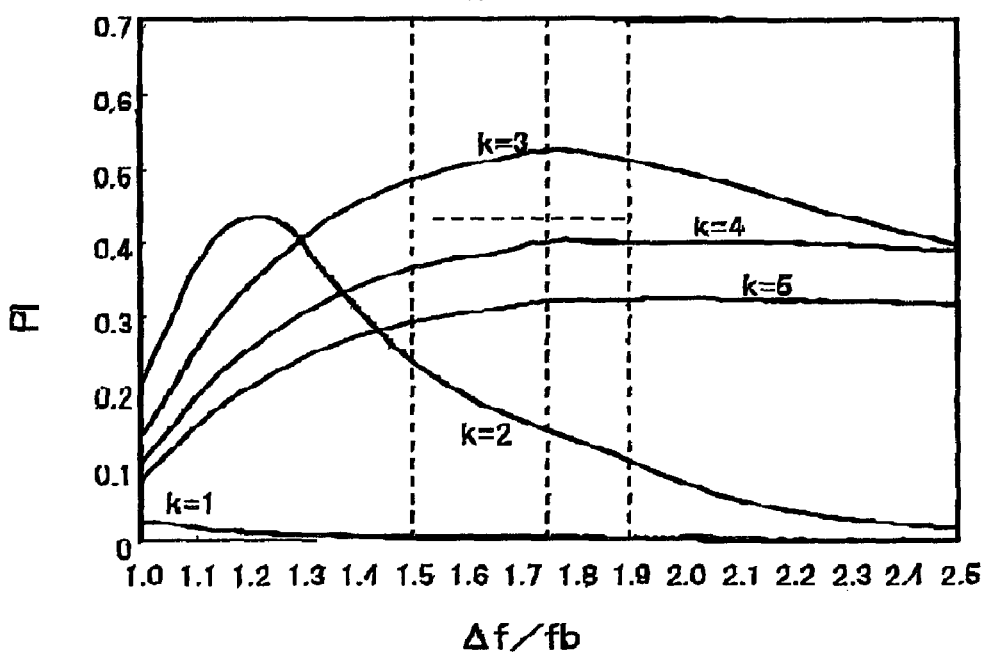
FIG. 18 is a graph showing the relationship of PI to Δf/fb in the case of n=3.0 in the first setting example with B/I=1.60.
Figure 19:
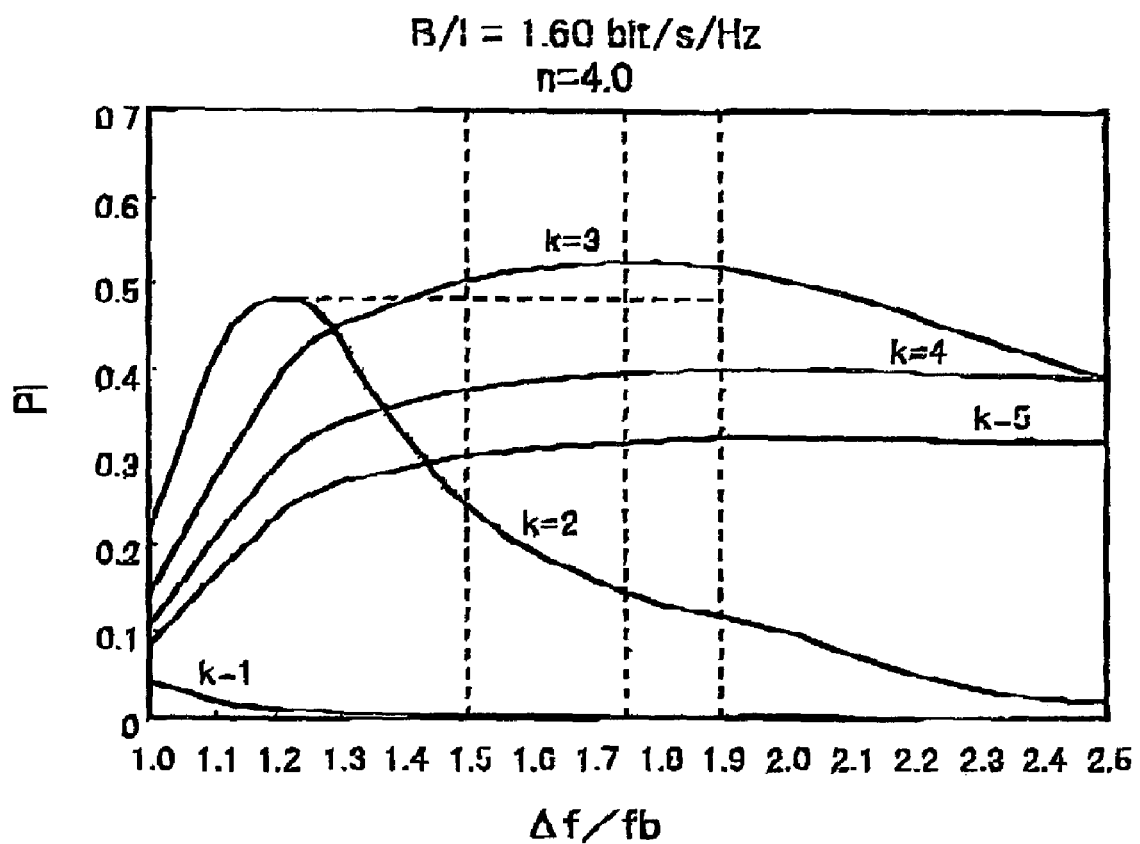
FIG. 19 is a graph showing the relationship of PI to Δf/fb in the case of n=4.0 in the first setting example with B/I=1.60.
Figure 20:
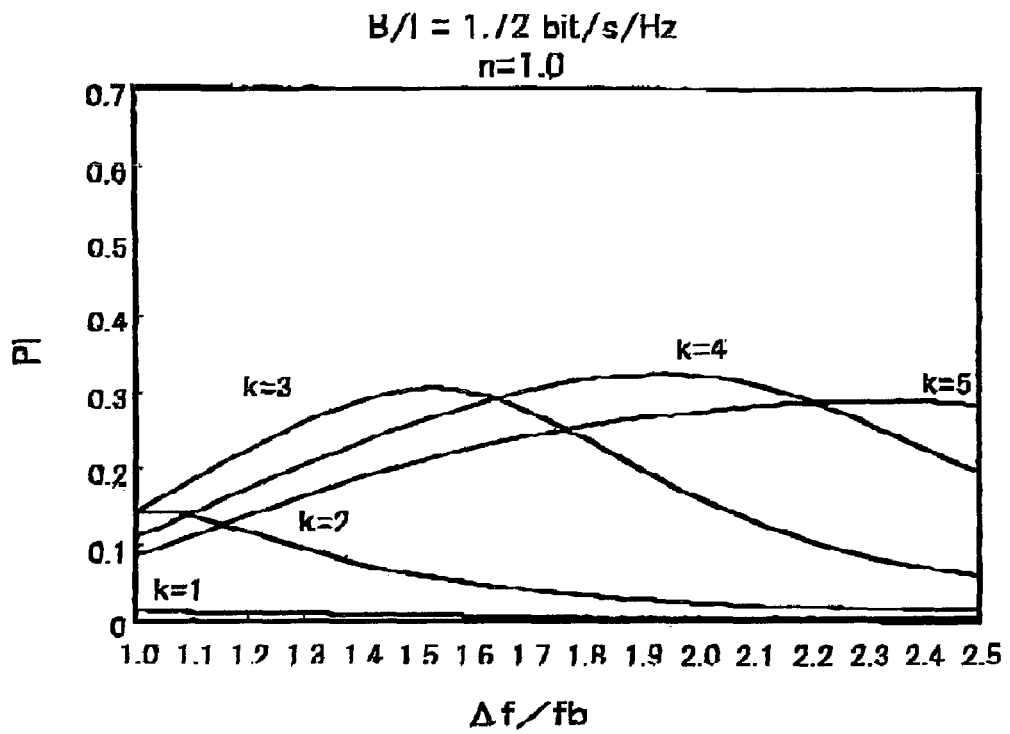
FIG. 20 is a graph showing the relationship of PI to Δf/fb in the case of n=1.0 in a second setting example with B/I=1.72.
Figure 21:
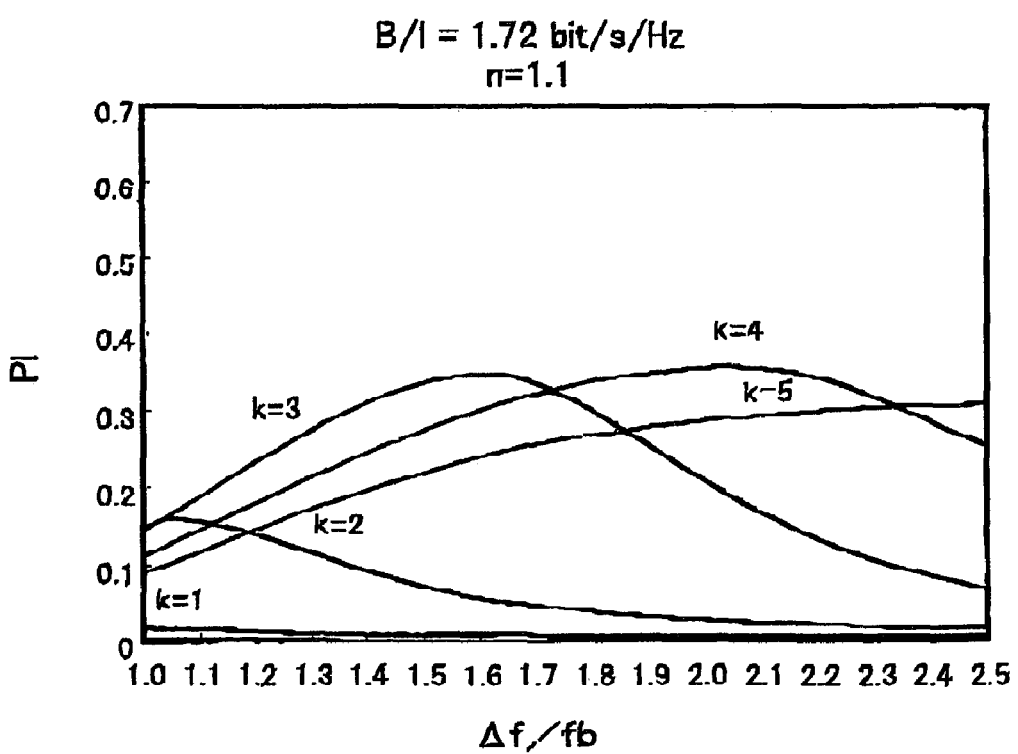
FIG. 21 is a graph showing the relationship of PI to Δf/fb in the case of n=1.1 in the second setting example with B/I=1.72.
Figure 22:
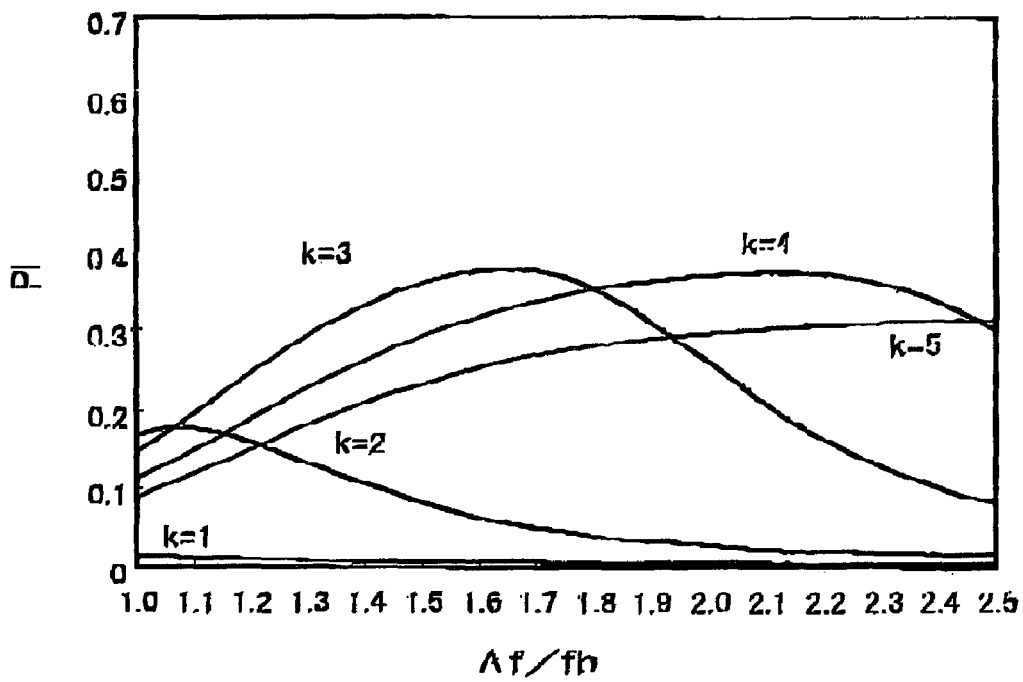
FIG. 22 is a graph showing the relationship of PI to Δf/fb in the case of n=1.2 in the second setting example with B/I=1.72.
Figure 23:
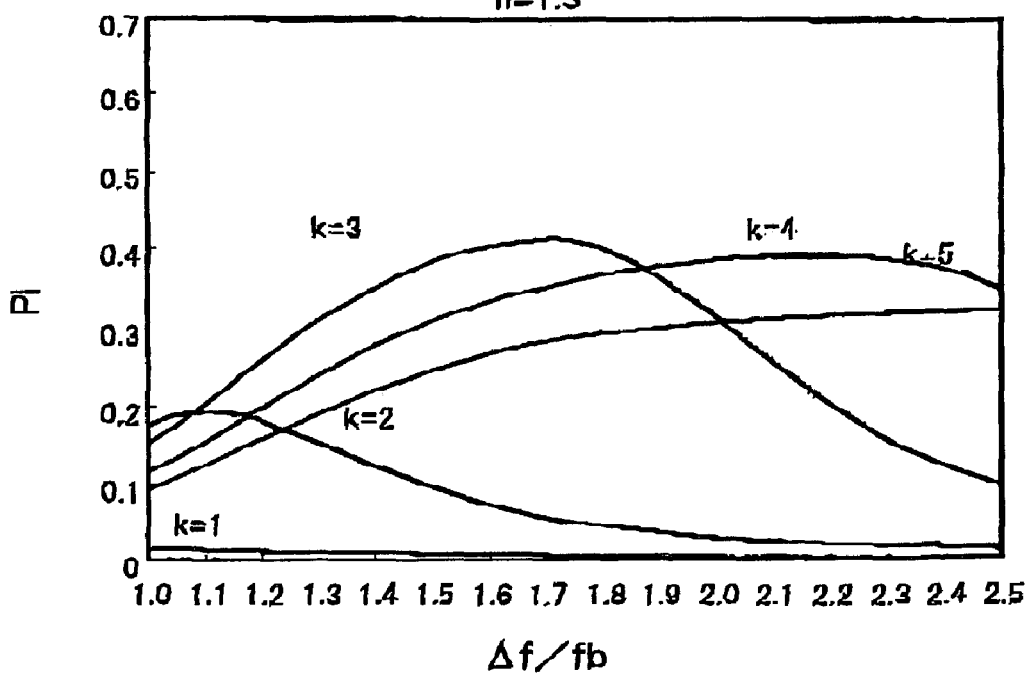
FIG. 23 is a graph showing the relationship of PI to Δf/fb in the case of n=1.3 in the second setting example with B/I=1.72.
Figure 24:
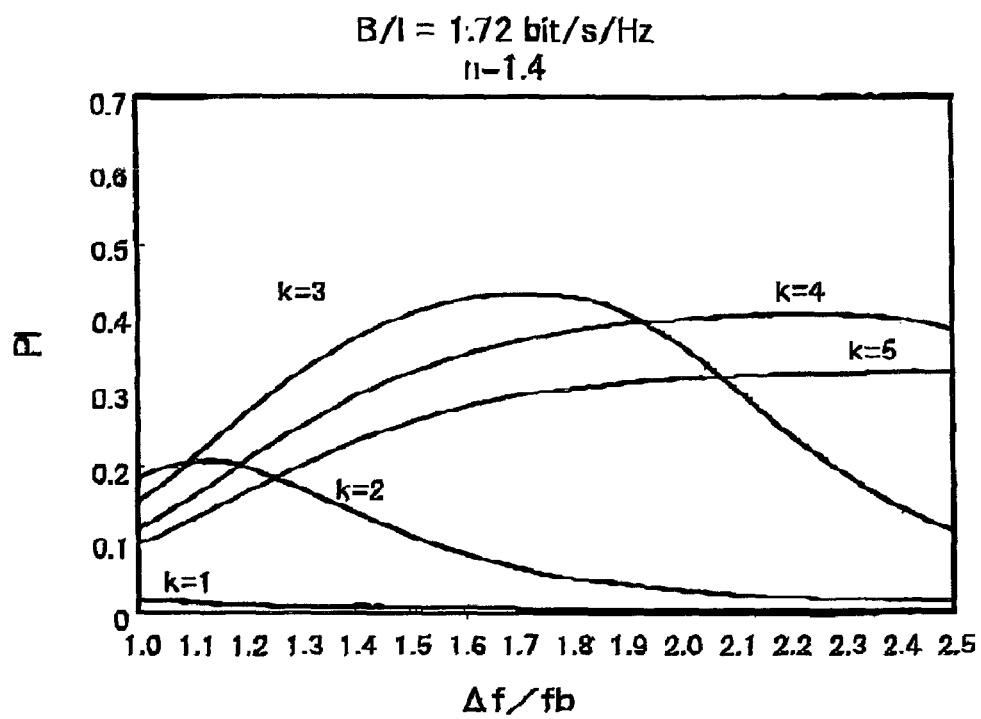
FIG. 24 is a graph showing the relationship of PI to Δf/fb in the case of n=1.4 in the second setting example with B/I=1.72.
Figure 25:
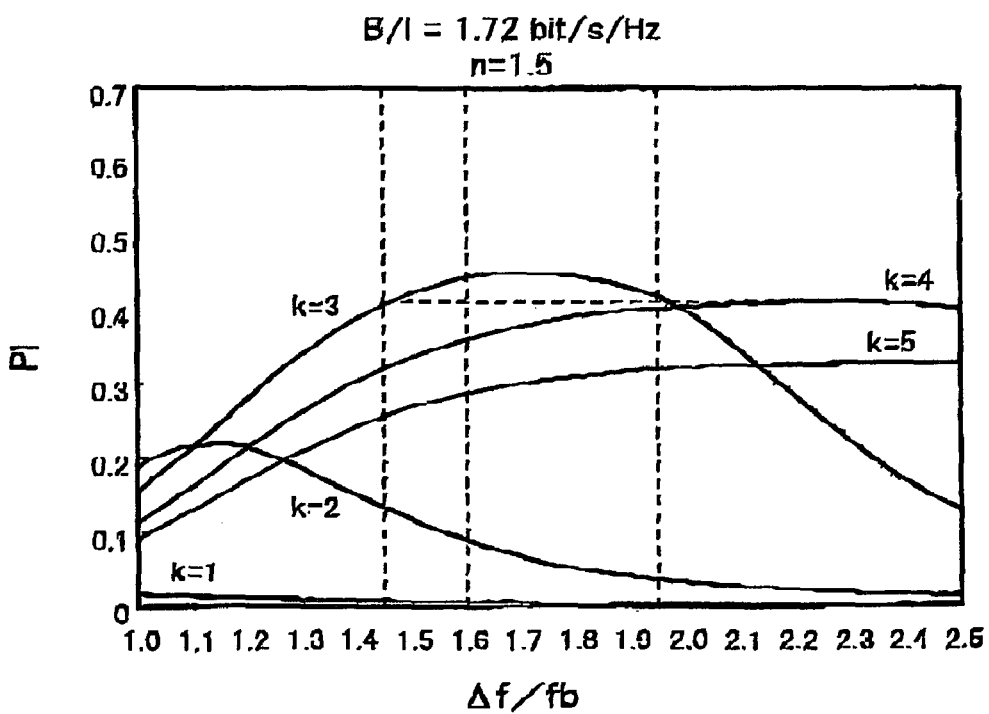
FIG. 25 is a graph showing the relationship of PI to Δf/fb in the case of n=1.5 in the second setting example with B/I=1.72.

FIG. 11 to FIG. 19 show the results obtained by calculating the relationship of the performance index PI to the value Δf/fb obtained by dividing the full width at half maximum Δf by the clock frequency fb of the signal light in the first setting example. Note, FIG. 11 to FIG. 16 show a case where the order "n" is increased from 1.0 to 1.5 at intervals of 0.1, and FIG. 17 to FIG. 19 show a case where the order "n" is increased from 2 to 4 at intervals of 1.

The calculation results of FIG. 11 to FIG. 19 show that, in order to obtain the maximum performance index PI in the case where the natural number "k", which determines the frequency spacing S=kl, is set to 3, similarly to when the secondary filter characteristic as shown in FIG. 6 is assumed, the order "n" in the equation (2) may be 1.2 or more. Accordingly, by setting the order "n" to 1.2 or more and optimizing the bandwidth Δf of the filter such that the performance index PI approaches the maximum value, it becomes possible to further increase the transmission distance-capacity product. To be specific, by setting the bandwidth Δf of the filter such that the value of Δf/fb is within a range of 1.50 to 1.90 as shown by the broken lines in FIG. 13 to FIG. 19, an effect of increasing the transmission distance-capacity product can be obtained, and specifically when Δt/fb=1.75, the maximum effect can be obtained.

Next, as a second setting example, a case is considered wherein it is assumed that the ratio B/I of the bit rate B and the frequency grid I of the signal light is set to 1.72 bit/s/Hz. Such a setting condition compounds to, for example, a case where the bit rate B=43 Gbit/s, and the frequency grid I=25 GHz. Note, the signal light of 40 Gbit/s can be obtained when error correction by RS (255, 239) code or BCH (8160.7648.39) code is performed on the SONET signal light of 40 G, or the like.

Figure 26:
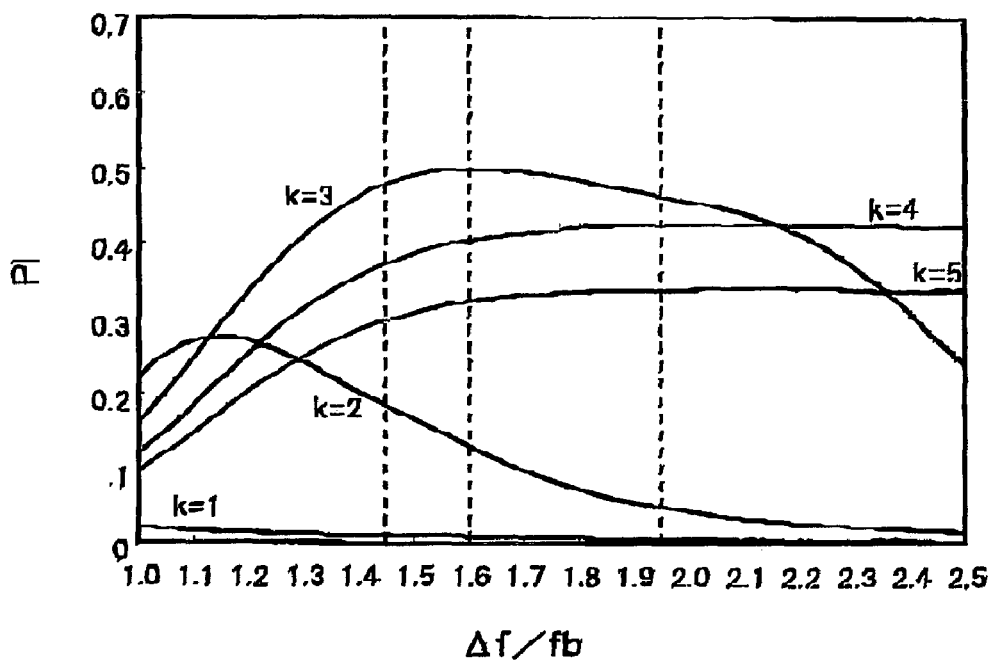
FIG. 26 is a graph showing the relationship of PI to Δf/fb in the case of n=2.0 in the second setting example with B/I=1.72.
Figure 27:
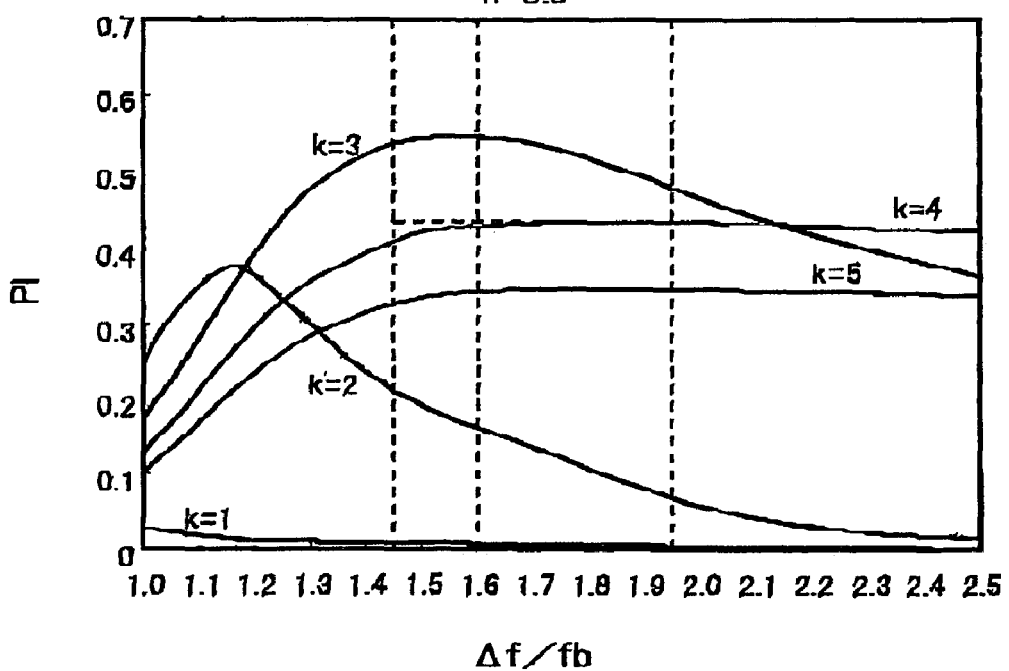
FIG. 27 is a graph showing the relationship of PI to Δf/fb in the case of n=3.0 in the second setting example with B/I=1.72.
Figure 28:
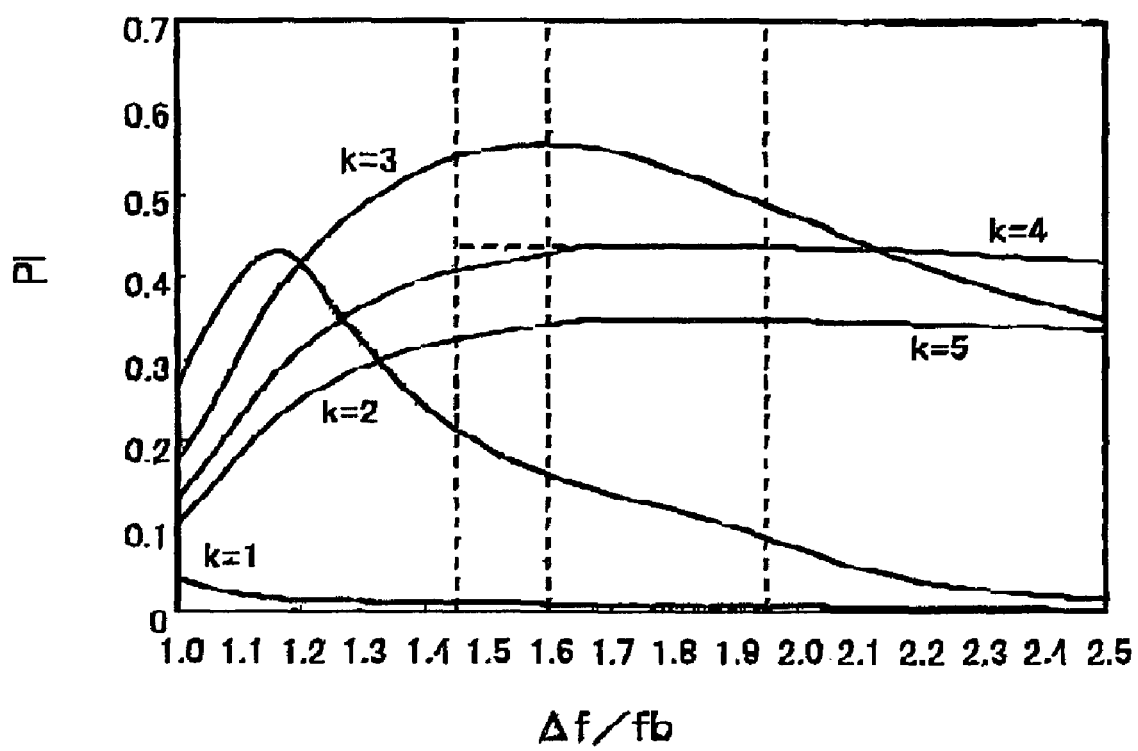
FIG. 28 is a graph showing the relationship of PI to Δf/fb in the case of n=4.0 in the second setting example with B/I=1.72.
Figures 29, 30:
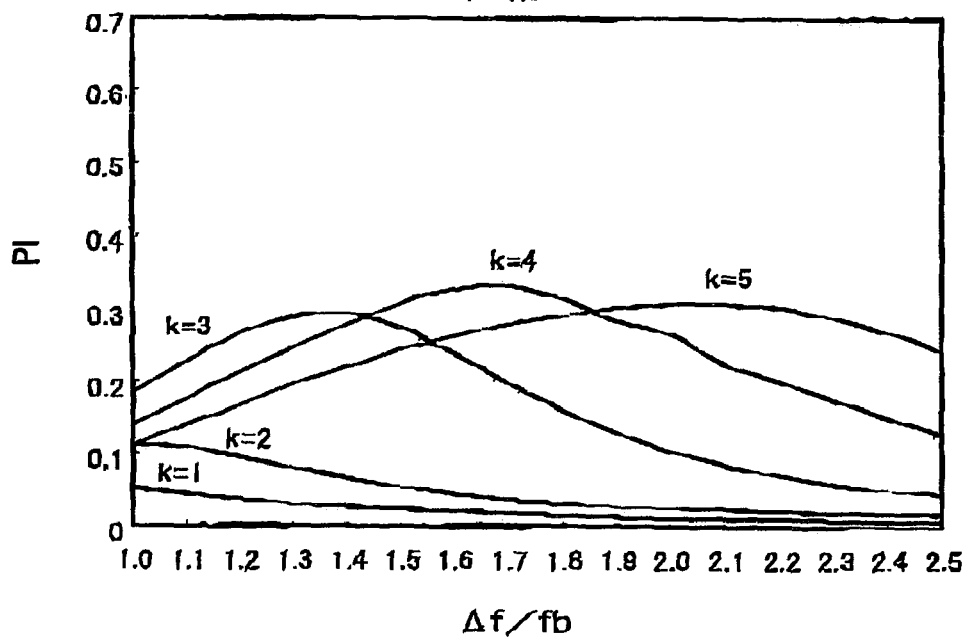
FIG. 29 is a graph showing the relationship of PI to Δf/fb in the case of n=1.0 in a third setting example with B/I=2.00.
FIG. 30 is a graph showing the relationship of PI to Δf/fb in the case of n=1.1 in the third setting example with B/I=2.00.
Figure 31:
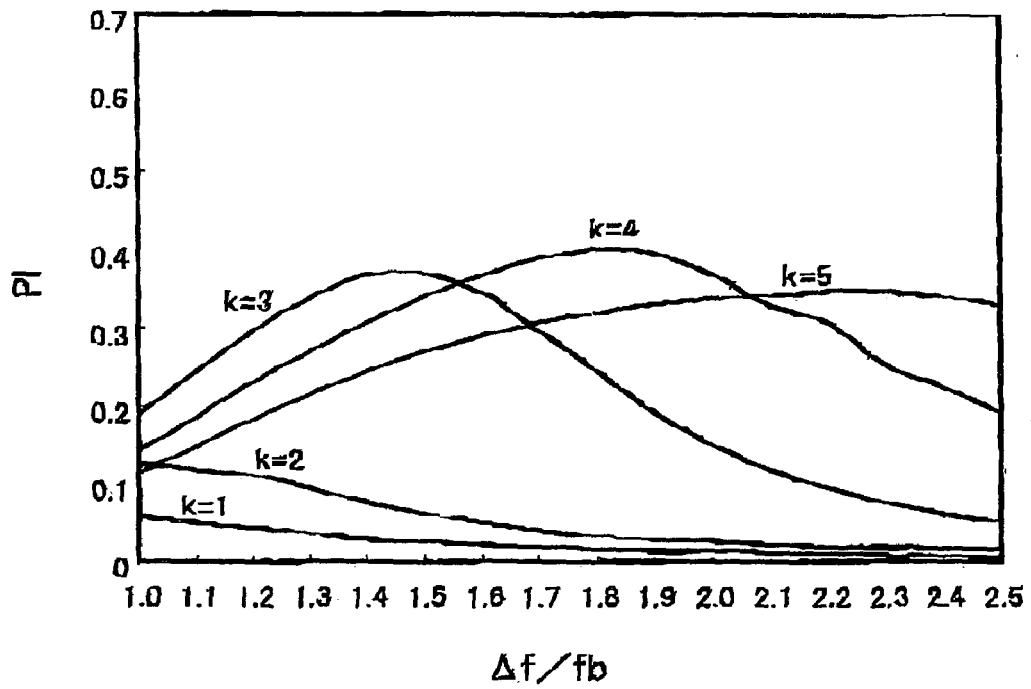
FIG. 31 is a graph showing the relationship of PI to Δf/fb in the case of n=1.2 in a third setting example with B/I=2.00.
Figure 32:
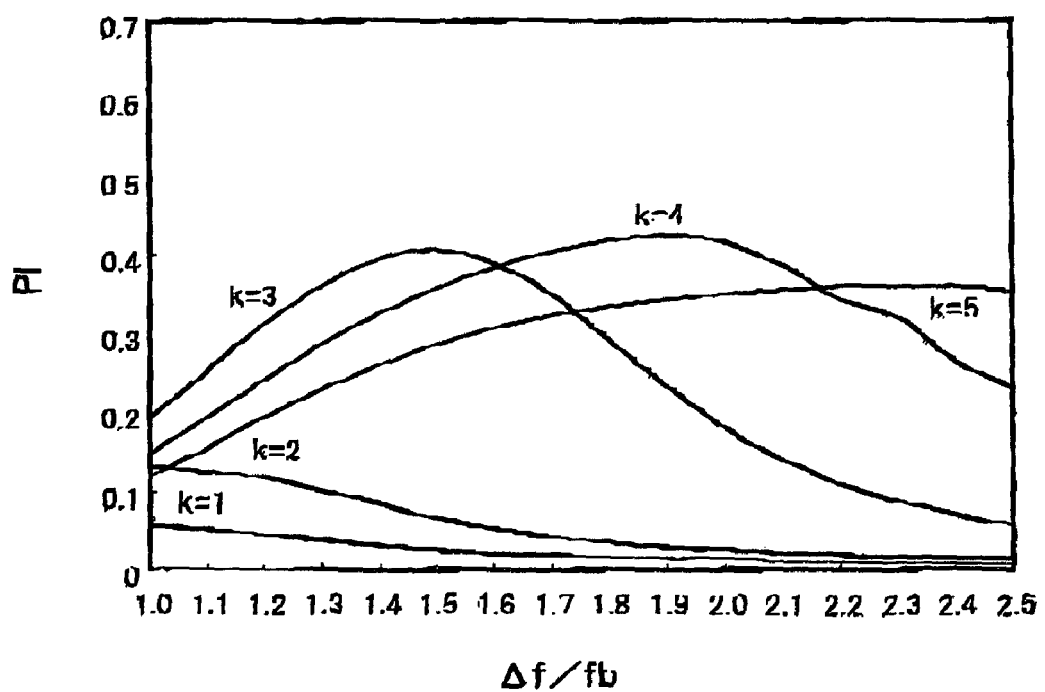
FIG. 32 is a graph showing the relationship of PI to Δf/fb in the case of n=1.3 in a third setting example with B/I=2.00.
Figure 33:
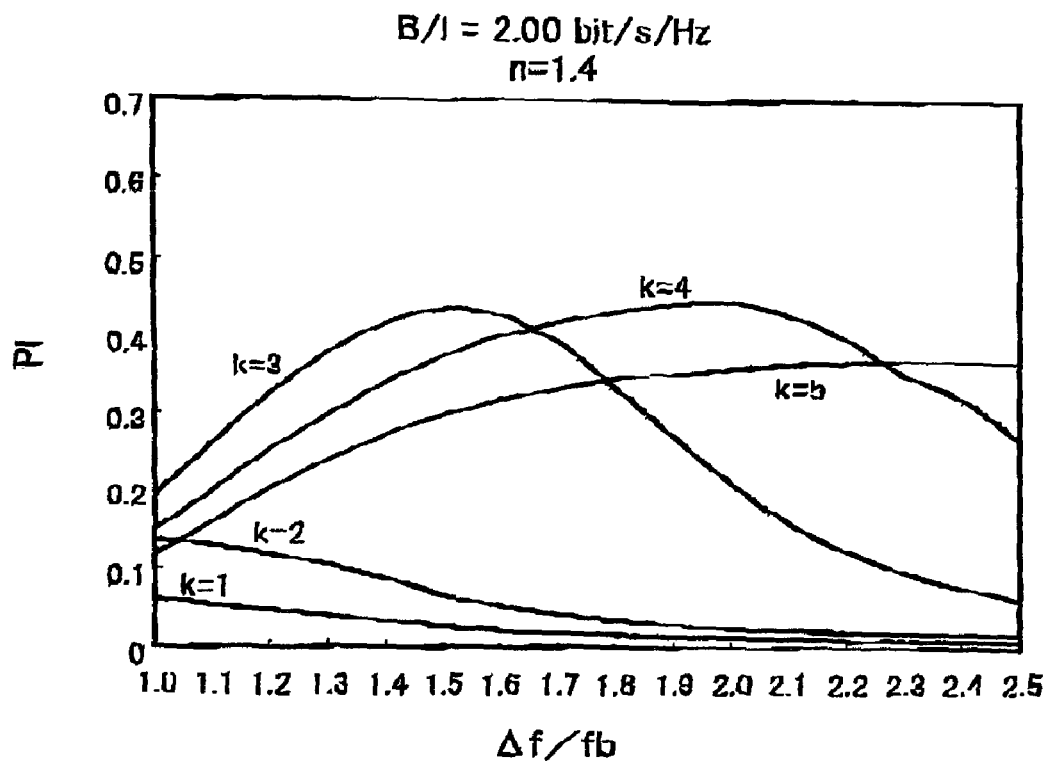
FIG. 33 is a graph showing the relationship of PI to Δf/fb in the case of n=1.4 in a third setting example with B/I=2.00.
Figure 34:
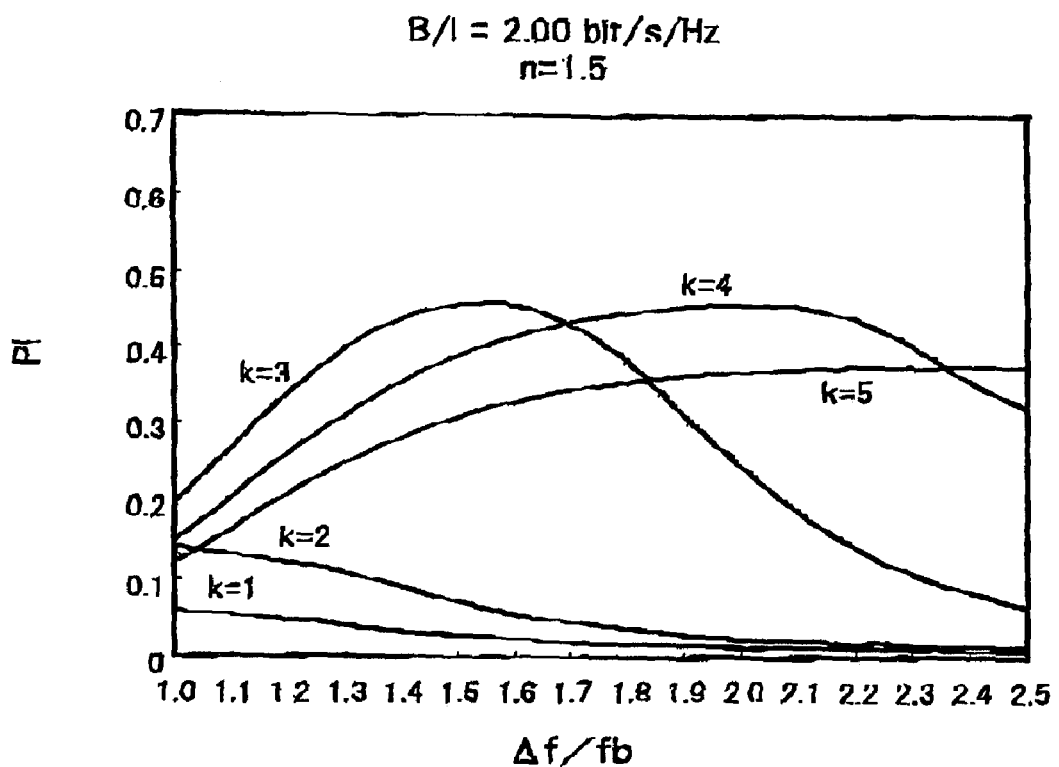
FIG. 34 is a graph showing the relationship of PI to Δf/fb in the case of n=1.5 in a third setting example with B/I=2.00.

FIG. 20 to FIG. 28 show the results obtained by calculating the relationship of the performance index PI to the value Δf/fb in the second setting example. Note, FIG. 20 to FIG. 25 show a case where the order "n" is increased from 1.0 to 1.5 at interval of 0.1, and FIG. 26 to FIG. 28 show a case where the order "n" is increased from 2 to 4 at intervals of 1.

The calculation results of FIG. 20 to FIG. 28 show that similarly to when the secondary filter characteristic is assumed, in order to obtain the maximum performance index PI in the case where the natural number "k" is set to 3, the order "n" in the equation (2) may be 1.5 or more, and by optimizing the bandwidth Δf of the filter so that the performance index PI approaches the maximum value, it becomes possible to further increase the transmission distance-capacity product. To be specific, by setting the bandwidth Δf of the filter so that the value of Δf/fb is within a range of 1.35 to 1.70 as shown by the broken lines in FIG. 25 to FIG. 28, an effect of increasing the transmission distance-capacity product can be obtained, and specifically when Δf/fb=1.60, the maximum effect can be obtained.

Next, as a third setting example, the consideration is made on a case where it is assumed that the rate B/I of the bit rate B and the frequency grid I of the signal light is set to 2.00 bit/s/Hz. Such a setting condition corresponds to, for example, a case where the bit rate B-50 Gbit/s, and the frequency grid I=25 GHz. Here the signal light of 50 bit/s can be obtained when error correction by RS connected code is performed on the SONET signal light of 40 G, or the like.

Figure 35:
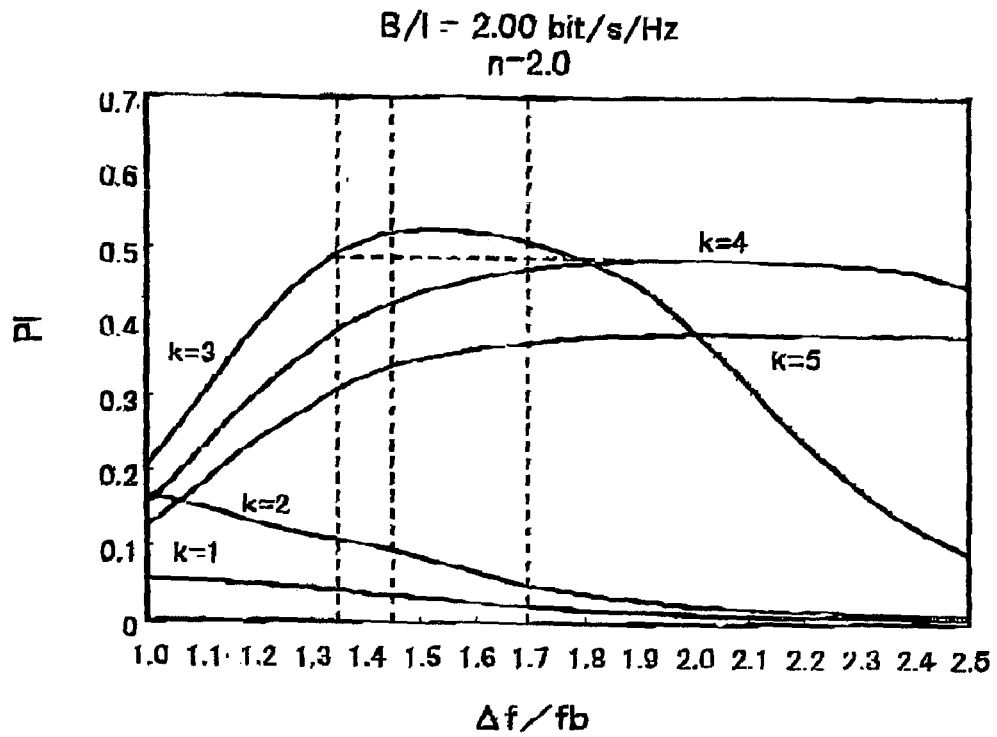
FIG. 35 is a graph showing the relationship of PI to Δf/fb in the case of n=2.0 in a third setting example with B/I=2.00.
Figure 36:
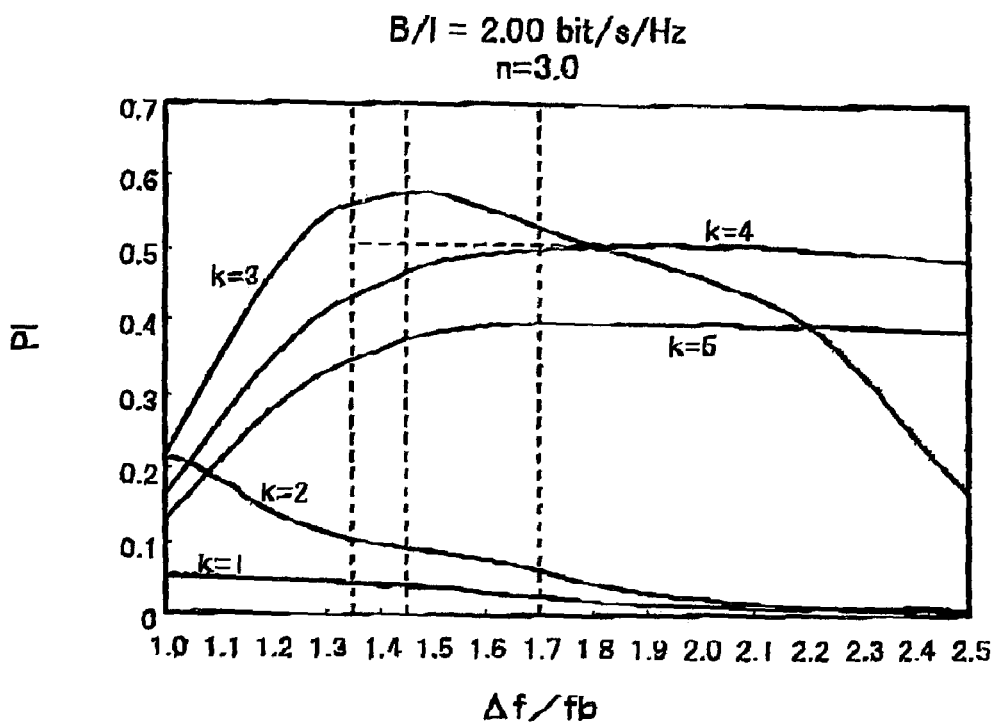
FIG. 36 is a graph showing the relationship of PI to Δf/fb in the case of n=3.0 in a third setting example with B/I=2.00.
Figure 37:
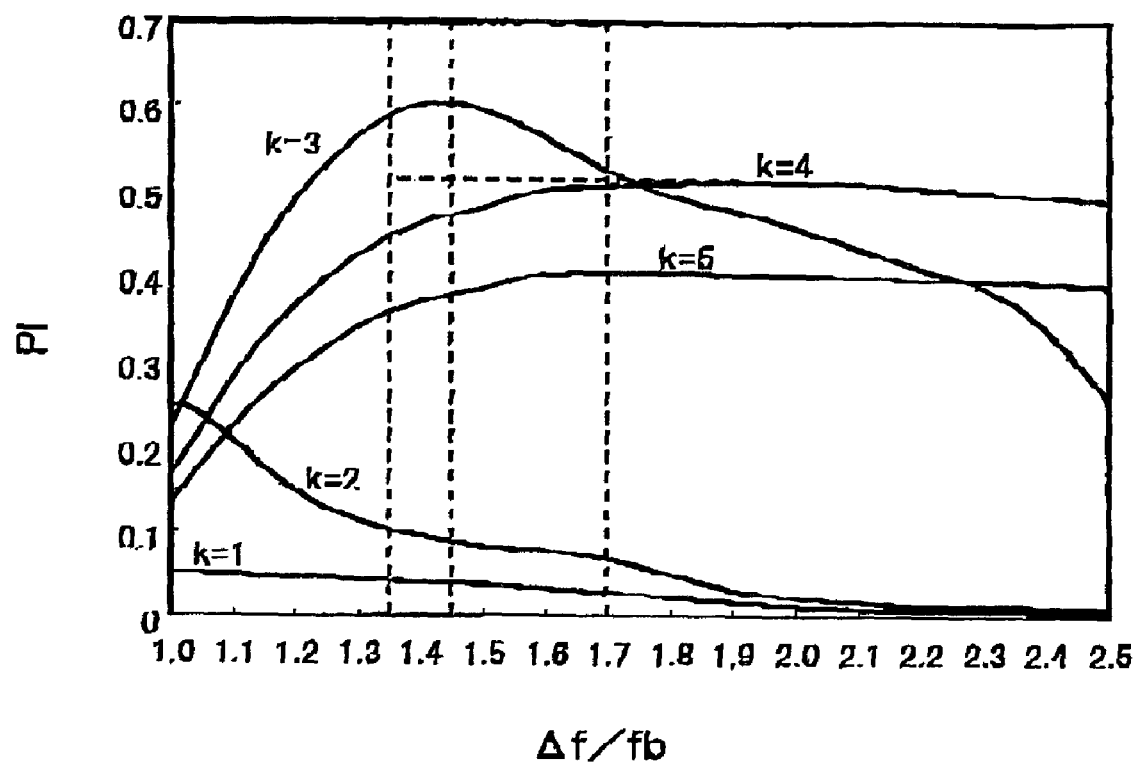
FIG. 37 is a graph showing the relationship of PI to Δf/fb in the case of n=4.0 in a third setting example with B/I=2.00.

FIG. 29 to FIG. 37 show the results obtained by calculating the relationship of the performance index PI to the value Δf/fb in the third setting example. Here, FIG. 29 to FIG. 34 show a case where the order "n" is increased from 1.0 to 1.5 at intervals of 0.1, and FIG. 35 to FIG. 37 show a case where the order "n" is increased from 2 to 4 at intervals of 1.

The calculation results of FIG. 29 to FIG. 37 show that similarly to the case where the secondary filter characteristic is assumed, in order to obtain the maximum performance index PI in the case where the natural number "k" is set to 3, the order "an" in the equation (2) may be 2.0 or more, and by optimizing the bandwidth Δf of the filter so that that the performance index PI approaches the maximum value, it is possible to increase the transmission distance-capacity product. To be specific, by setting the bandwidth Δf of the filter such that the value of Δf/fb is within the range of 1.35 to 1.70 as shown by the broken lines in FIG. 35 to FIG. 37, an effect of increasing the transmission distance-capacity product can be obtained, and specifically when Δf/fb=1.45, the maximum effect can be obtained.

As shown in the analysis results corresponding to the first to the third setting examples described above, the filter characteristics of the optical multiplexer 2 and the optical demultiplexer 4 designed in accordance with the optimization techniques of the present invention are effective in a comparatively wide range with respect to the order of "n" (shape of filter characteristics) and transmission bandwidth Δf of the equation model, thus enabling the optical multiplexer 2 and the optical demultiplexer 4 to be realized by the constitution in which the known optical filter as shown in FIG. 8 to FIG. 10 is utilized. Further, since the analysis results corresponding to the first to the third setting examples are discussed based on standard frequencies, even if the setting of the bit rate B or the frequency grid I is changed to a value other than the above, general applicability is not lost. Accordingly, the present invention is also applicable to the design of system corresponding to a bit rate other than 40 to 60 Gbit/s, to be specific, a range of bit rates to be assumed based on SONET/SDH as described above.

As described above, by specifying the spectrum efficiency B/S at which the performance index PI becomes maximum, and optimizing the bit rate and frequency arrangement of WDM signal light, and the filter characteristic of the optical multiplexer 2 and the optical demultiplexer 4 so as to approach the spectrum efficiency B/S it is possible to achieve the increase in the transmission distance-capacity product while realizing high spectrum efficiency exceeding 0.4 bits/Hz, without applying the orthogonal polarization transmission or the polarization division multiplexing transmission. As a result, it becomes possible to provide a large capacity optical transmission system in which a high density wavelength division multiplexing optical transmission is realized using low cost and small sized optical senders 1 and optical receivers 5.

What is claimed are:

1. A wavelength division multiplexing optical transmission system, comprising:
a plurality of optical senders outputting signal lights with different wavelengths and filtered by a plurality of respective filters, and said filters are configured to yield filtered signal lights having respective bit rates and frequency spacing to approach a spectrum efficiency at which a product of a transmission distance and a transmission capacity of the system is maximized;
an optical multiplexer multiplexing the filtered signal lights to be transmitted to an optical transmission path as a wavelength division multiplexing signal light; and
an optical demultiplexer demultiplexing the wavelength division multiplexing signal light having different respective wavelengths to be received by a plurality of optical receivers,
wherein the type of modulation of said signal light is an NRZ modulation type, and
wherein an equation model expressing transmission characteristics of said optical multiplexer and said optical demultiplexer is expressed by the following equation in which each transmission band T(f) corresponding to each signal light is expressed by using a frequency f, where fc is a center frequency of the transmission band, and Δf is a full width at half maximum of the transmission band, as a filter order "n"

$$T(f) = 10 \cdot \log\left[\exp\left\{-2 \cdot \ln\sqrt{2} \cdot \left(\frac{|f - fc|}{\Delta f/2}\right)^{2n}\right\}\right], (dB)$$

wherein the spectrum efficiency at which the product of said transmission distance and said transmission capacity becomes the maximum value is calculated as spectrum efficiency at which a performance index PI=10·(−ΔQ/10)·B/S, which is expressed using a Q-value degradation amount ΔQ of the system, a bit rate B and frequency spacing S of the signal light, becomes a maximum value.

2. A wavelength division multiplexing optical transmission system according to claim 1,
wherein said filter order "n" is secondary, and the spectrum efficiency at which the product of said transmission distance and said transmission capacity becomes the maximum value is 0.574 bit/s/Hz.

3. A wavelength division multiplexing optical transmission system according to claim 2,
wherein, when the bit rate B and frequency grid I per one wave of the signal light are given in advance, a natural number "k" is selected so as to minimize a difference between the spectrum efficiency B/(kl) where "k" is the natural number, and the spectrum efficiency at which the product of said transmission distance and said transmission capacity becomes the maximum value, so that frequency spacing S=kl, of the signal light is set in accordance with the natural number "k".

4. A wavelength division multiplexing optical transmission system according to claim 3,
wherein, when a value B/I obtained by dividing said bit rate B by said frequency grid I is 1.6 to 2.0 bit/s/Hz, 3 is selected as said natural number "k".

5. A wavelength division multiplexing optical transmission system according to claim 4,
wherein, when 40 to 50 Gbit/s is given as said bit rate B, and 25 GHz interval is given as said frequency grid I, frequency spacing is set to 75 GHz.

6. A wavelength division multiplexing optical transmission system according to claim 3,
wherein, when a value B/I obtained by dividing said bit rate B by said frequency grid I is 1.6 bit/s/Hz, and 3 is selected as said natural number "k",
said optical multiplexer and said optical demultiplexer have transmission characteristics following said equation model in which said filter order "n" is 1.2 or more.

7. A wavelength division multiplexing optical transmission system according to claim 6,
wherein said optical multiplexer and said optical demultiplexer have transmission characteristics in which a value Δf/fb obtained by dividing full width at half maximum Δf of said transmission band by a clock frequency fb of the signal light, is within a range of 1.50 to 1.90.

8. A wavelength division multiplexing optical transmission system according to claim 3,
wherein, when a value B/I obtained by dividing said bit rate B by said frequency grid I is 1.7 bit/s/Hz, and 3 is selected as said natural number "k",
said optical multiplexer and said optical demultiplexer have transmission characteristics following said equation model in which said filter order "n" is 1.5 or more.

9. A wavelength division multiplexing optical transmission system according to claim 8,
wherein said optical multiplexer and said optical demultiplexer have transmission characteristics in which a value Δf/fb obtained by dividing full width at half maximum Δf of said transmission band by a clock frequency fb of the signal light, is within a range of 1.45 to 1.95.

10. A wavelength division multiplexing optical transmission system according to claim 3,
wherein, when a value B/I obtained by dividing said bit rate B by said frequency grid I is 2.0 bit/s/Hz, and 3 is selected as said natural number "k",
said optical multiplexer and said optical demultiplexer have transmission characteristics following said equation model in which said filter order "n" is 2 or more.

11. A wavelength division multiplexing optical transmission system according to claim 10,
wherein said optical multiplexer and said optical demultiplexer have transmission characteristics in which a value Δf/fb obtained by dividing full width at half maximum Δf of said transmission band by a clock frequency fb of the signal light, is within a range of 1.35 to 1.70.

12. A wavelength division multiplexing optical transmission system according to claim 1,
wherein each of said optical multiplexer and said optical demultiplexer is constituted using an arrayed waveguide grating.

13. A wavelength division multiplexing optical transmission system according to claim 1,
wherein each of said optical multiplexer and said optical demultiplexer is constituted by combining an optical interleaver using an interference filter, and an arrayed waveguide grating.

14. A wavelength division multiplexing optical transmission system according to claim 1,
wherein each of said optical multiplexer and said optical demultiplexer is constituted by combining an optical interleaver using an interference filter, and a dielectric multi-layer film filter.

15. A wavelength division multiplexing optical transmission method, comprising:
multiplexing a plurality of signal lights with different wavelengths to transmit to an optical transmission path; and
demultiplexing wavelength division multiplexed signal light propagated through said optical transmission path according to wavelength to receive,
wherein the type modulation of said signal light is an NRZ modulation type, and
wherein an equation model expressing transmission characteristics of said optical multiplexer and said optical demultiplexer is expressed by the following equation in which the shape of each transmission band T(f) corresponding to each signal light is expressed by as a function of frequency f, wherein fc is a center frequency of the transmission band, and Δf is a full width at half maximum of the transmission band, and a filter order "n", $$T(f) = 10 \cdot \log\left[\exp\left\{-2 \cdot \ln\sqrt{2} \cdot \left(\frac{|f - fc|}{\Delta f/2}\right)^{2n}\right\}\right] \text{ (dB)}$$

setting a bit rate and frequency spacing of the signal lights so as to approach a spectrum efficiency at which a product of a transmission distance and a transmission capacity becomes maximum, and actual transmission characteristics at the time of multiplexing and demultiplexing the signal light are set in accordance with said equation model, to transmit the wavelength division multiplexed signal light,
wherein the spectrum efficiency at which the product of said transmission distance and said transmission capacity becomes the maximum value is calculated as spectrum efficiency at which a performance index PI=10·(−ΔQ/10)·B/S, which is expressed using a Q-value degradation amount ΔQ of the system, a bit rate B and frequency spacing S of the signal light, becomes a maximum value.

16. A wavelength division multiplexing optical transmission method, comprising:
multiplexing a plurality of signal lights with different wavelengths to transmit to an optical transmission path;
demultiplexing wavelength division multiplexed signal light propagated through said optical transmission path according to the received wavelength;
modulating said signal light as only an NRZ modulation type;
expressing transmission characteristics of said optical multiplexing and said optical demultiplexing by the following equation in which the shape of each transmission band T(f) corresponding to each signal light is expressed by as a function of frequency f, wherein fc is a center frequency of the transmission band, and Δf is a full width at half maximum of the transmission band, and a filter order "n", $$T(f) \approx 10 \cdot \log\left[\exp\left\{-2 \cdot \ln\sqrt{2} \cdot \left(\frac{|f - fc|}{\Delta f/2}\right)^{2n}\right\}\right] \text{ (dB)}$$

maximizing a product of a transmission distance and a transmission capacity by setting a bit rate and frequency spacing of the signal lights;
setting actual transmission characteristics at the time of multiplexing and demultiplexing the signal light in accordance with said equation, and
transmitting the wavelength division multiplexed signal light,
wherein the spectrum efficiency at which the product of said transmission distance and said transmission capacity becomes the maximum value is calculated as spectrum efficiency at which a performance index PI=10·(−ΔQ/10)·B/S, which is expressed using a Q-value degradation amount ΔQ of the system, a bit rate B and frequency spacing S of the signal light, becomes a maximum value.

* * * * *